(12) United States Patent
Christian et al.

(10) Patent No.: US 10,387,214 B1
(45) Date of Patent: Aug. 20, 2019

(54) MANAGING DATA PROCESSING IN A DISTRIBUTED COMPUTING ENVIRONMENT

(71) Applicant: SAS Institute Inc., Cary, NC (US)

(72) Inventors: Stacey Michelle Christian, Cary, NC (US); Steven Daniel Miles, Cary, NC (US); Katherine Fullington Taylor, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 16/357,848

(22) Filed: Mar. 19, 2019

Related U.S. Application Data

(60) Provisional application No. 62/650,283, filed on Mar. 30, 2018, provisional application No. 62/686,614, filed on Jun. 18, 2018.

(51) Int. Cl.
*G06F 9/50* (2006.01)
*G06F 3/0481* (2013.01)
*G06N 20/00* (2019.01)
*G06F 9/52* (2006.01)

(52) U.S. Cl.
CPC .......... *G06F 9/5083* (2013.01); *G06F 3/0481* (2013.01); *G06F 9/52* (2013.01); *G06N 20/00* (2019.01)

(58) Field of Classification Search
CPC .................................................. G06F 9/5083
See application file for complete search history.

(56) References Cited

U.S. PATENT DOCUMENTS

| 8,024,395 B1* | 9/2011 | Odom ................... G06F 9/5072 709/201 |
| 2015/0268993 A1* | 9/2015 | Montesinos Ortego ..................... G06F 9/4881 718/106 |
| 2017/0031728 A1* | 2/2017 | Zhao ..................... G06F 9/4843 |

OTHER PUBLICATIONS

"Non-Linear Partitioning Example: The Langmuir Isotherm", retrieved via internet at https://www.goldsim.com/Help/index.html on May 2, 2018, 4 pages.
Baharev et al., "A robust approach for finding all well-separated solutions of sparse systems of nonlinear equations", Numerical Algorithms, vol. 76, Issue 1, Sep. 2017, pp. 163-189.
Castillo Castillo et al., "Global Optimization of Nonlinear Blend-Scheduling Problems", Engineering, vol. 3, 2017, pp. 188-201.
Christiansen et al., "A Comparative Analysis of Numerical Methods for Solving Systems of Nonlinear Algebraic Equations", 2019, 14 pages.

(Continued)

*Primary Examiner* — Charlie Sun
(74) *Attorney, Agent, or Firm* — Kilpatrick Townsend & Stockton LLP

(57) ABSTRACT

Data processing can be managed in a distributed computing environment (DCE). In one example, the DCE can receive a sequence of computing operations to be consecutively executed in the DCE. For each computing operation in the sequence, the DCE can receive input data for the computing operation, partition the input data into subsets, and determine whether the computing operation is linear or non-linear. The DCE can then apply different processing techniques to the subsets depending on whether the computing operation is linear or non-linear.

30 Claims, 16 Drawing Sheets

(56) References Cited

OTHER PUBLICATIONS

Donaldson, "Grid-Graph Partitioning", A dissertation submitted in partial fulfillment of the requirements for the degree of Doctor of Philosophy (Computer Sciences) at the University of Wisconsin—Madison, 2000, 147 pages.

Junglas, "Optimised Grid-Partitioning for Block Structured Grids in Parallel Computation", Doctors of science approved dissertation, Apr. 27, 2006, 271 pages.

Luenberger et al., "Linear and Nonlinear Programming", Springer Science+Business Media, LLC, 2008, 555 pages.

Matthies, "Partitioned but Strongly Coupled Iteration Schemes for Nonlinear Fluid-Structure Interaction", Contributed to a special Issue of Computers and Structures, Oct. 2002, 14 pages.

* cited by examiner

| Order | Operation | Input Data | Type of Operation |
|---|---|---|---|
| 1 | Calculate Emission Per Plant based on Equation (1) | Emission by Generating Units in Each Plant | Non-linear |
| 2 | Calculate Emission Per Utility based on Equation (2) | Emission by Plants in Each Utility | Non-linear |
| 3 | Calculate Emission Per Country based on Equation (3) | Emission by Utilities in Each Country | Non-linear |

Sequence of Operations 1302

FIG. 13

| Order | Operation | Input Data | Type of Operation |
|---|---|---|---|
| 1 | Calculate Emission Per Plant based on Equation (4) | Emission by Generating Units in Each Plant | Linear |
| 2 | Calculate Emission Per Utility based on Equation (5) | Emission by Plants in Each Utility | Linear |
| 3 | Calculate Emission Per Parent Holding Company based on Equation (6) | Emission by Utilities in Each Parent Holding Company | Linear |
| 4 | Calculate Emission Per Country based on Equation (7) | Emission by Parent Holding Company in Each Country | Non-linear |

Sequence of Operations 1502

FIG. 15

MANAGING DATA PROCESSING IN A DISTRIBUTED COMPUTING ENVIRONMENT

REFERENCE TO RELATED APPLICATION

This application claims the benefit of priority under 35 U.S.C. § 119(e) to U.S. Provisional Patent Application No. 62/686,614, filed Jun. 18, 2018, and to U.S. Provisional Patent Application No. 62/650,283, filed Mar. 30, 2018, the entirety of each of which is hereby incorporated by reference herein.

TECHNICAL FIELD

The present disclosure relates generally to distributed computing environment. More specifically, but not by way of limitation, this disclosure relates to managing data processing to execute a sequence of generic operations in a distributed computing environment.

BACKGROUND

A distributed computing environment can include multiple computing nodes in communication with each other over a network for processing data. Examples of a computing node can include a computing device, a server, a virtual machine, or any combination of these. The computing nodes can each process at least a portion of the data and provide a result. The distributed computing environment is typically used for performing operations such as linear calculations based on input data. Applying the distributed computing environment to non-linear operations can greatly improve the data processing capability of the distributed computing environment, but such an application is not straightforward.

SUMMARY

One example of the present disclosure includes a system. The system can include a processing device and a memory device comprising instructions that are executable by the processing device. The instructions can cause the processing device to receive a sequence of computing operations to be consecutively executed in a distributed computing environment formed from a plurality of nodes. The instructions can cause the processing device to, for each computing operation in the sequence of computing operations, receive input data for the computing operation and partition the input data into subsets such that each subset has at least one common characteristic that is different from the other subsets. The instructions can cause the processing device to determine whether the computing operation is linear or non-linear. The instructions can cause the processing device to, in response to determining that the computing operation is non-linear, assign the subsets to respective nodes among the plurality of nodes, cause the subsets to be transmitted to the respective assigned nodes, and cause the plurality of nodes to execute respective portions of the computing operation in parallel on the subsets to generate output results for the computing operation. The instructions can cause the processing device to, in response to determining that the computing operation is linear, cause the plurality of nodes to execute respective portions of the computing operation in parallel using local portions of the subsets that are already stored in local memories of the plurality of nodes to generate output results for the computing operation. The instructions can cause the processing device to transmit final output results to a client device communicatively coupled to the distributed computing environment, the final output results being the output results from a last computing operation in the sequence of computing operations.

Another example of the present disclosure includes a non-transitory computer readable medium comprising instructions that are executable by a processing device. The instructions can cause the processing device to receive a sequence of computing operations to be consecutively executed in a distributed computing environment formed from a plurality of nodes. The instructions can cause the processing device to, for each computing operation in the sequence of computing operations, receive input data for the computing operation and partition the input data into subsets such that each subset has at least one common characteristic that is different from the other subsets. The instructions can cause the processing device to determine whether the computing operation is linear or non-linear. The instructions can cause the processing device to, in response to determining that the computing operation is non-linear, assign the subsets to respective nodes among the plurality of nodes, cause the subsets to be transmitted to the respective assigned nodes, and cause the plurality of nodes to execute respective portions of the computing operation in parallel on the subsets to generate output results for the computing operation. The instructions can cause the processing device to, in response to determining that the computing operation is linear, cause the plurality of nodes to execute respective portions of the computing operation in parallel using local portions of the subsets that are already stored in local memories of the plurality of nodes to generate output results for the computing operation. The instructions can cause the processing device to transmit final output results to a client device communicatively coupled to the distributed computing environment, the final output results being the output results from a last computing operation in the sequence of computing operations.

Yet another example of the present disclosure includes a method. The method includes receiving, by a processing device, a sequence of computing operations to be consecutively executed in a distributed computing environment formed from a plurality of nodes. The method includes, for each computing operation in the sequence of computing operations, receiving, by the processing device, input data for the computing operation, and partitioning, by the processing device, the input data into subsets such that each subset has at least one common characteristic that is different from the other subsets. The method includes determining, by the processing device, whether the computing operation is linear or non-linear. The method includes, in response to determining that the computing operation is non-linear, assigning, by the processing device, the subsets to respective nodes among the plurality of nodes, causing, by the processing device, the subsets to be transmitted to the respective assigned nodes, and causing, by the processing device, the plurality of nodes to execute respective portions of the computing operation in parallel on the subsets to generate output results for the computing operation. The method includes, in response to determining that the computing operation is linear, causing, by the processing device, the plurality of nodes to execute respective portions of the computing operation in parallel using local portions of the subsets that are already stored in local memories of the plurality of nodes to generate output results for the computing operation. The method includes transmitting, by the processing device, final output results to a client device communicatively coupled to the distributed computing environment, the final output results being the output results from a last computing operation in the sequence of computing operations.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 13 is an example of a sequence of computing operations including non-linear operations according to some aspects.

FIG. 15 is an example of a sequence of computing operations including linear and non-linear operations according to some aspects.

Figure 1:
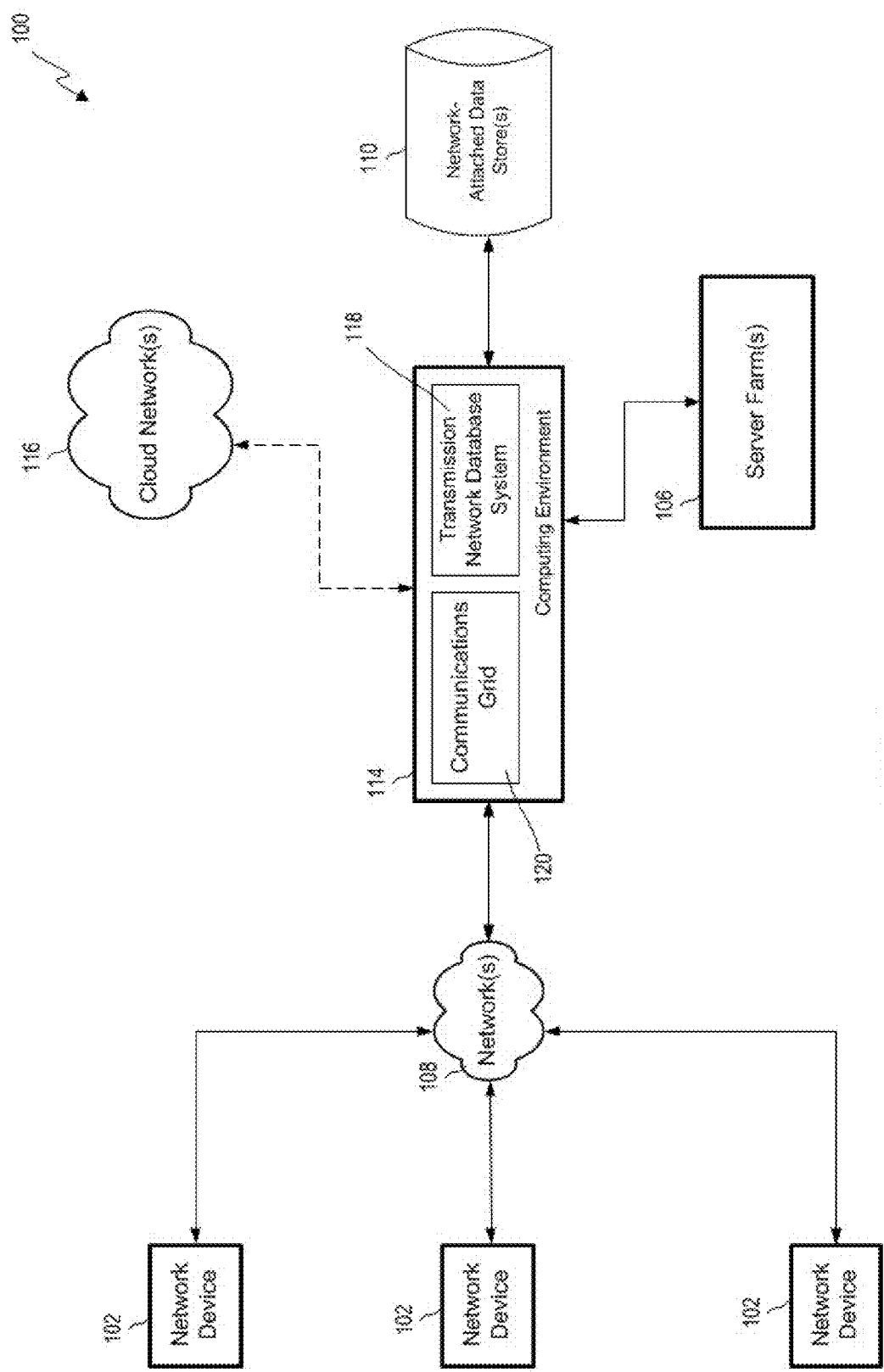
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain aspects and features of the present disclosure relate to executing a sequence of linear and non-linear operations in a distributed computing environment, such as a communications grid computing system. A linear operation can be split into two parts: one part that can be executed on the computing nodes in parallel with the inputs locally available on that node, and a second part that can be performed based on the results of the first part after those results have been collected from all the processing nodes onto a single node. A non-linear operation cannot be split into two parts in the way that a linear operation can be. As such, executing non-linear operations on a distributed computing environment cannot be performed in a way as described above for the linear operations, thereby resulting in a low speed in executing the non-linear operations. Without being able to efficiently handle the non-linear operations, the data processing capability of the distributed computing environment is greatly limited. Some examples of the present disclosure can overcome one or more of these issues by using partitioned executions of the non-linear operations so that the speed of executing a sequence of non-linear operations can be increased. As a result, any generic operations, linear or non-linear, can be efficiently executed in the distributed computing environment.

As a particular example, a distributed computing environment can include a communications grid computing system that includes multiple processing nodes. Each of the processing nodes can communicate with other nodes to transmit data, results, process data according to the operations that node is configured for, and transmit data to other nodes. The communications grid computing system can further include a processing device, such as a control node, a processing node, or other device of the distributed computing environment, configured for managing the execution of the computing operations on the processing nodes. The processing device can receive a request to execute a sequence of computing operations on input data in the communications grid computing system. In response to receiving the request, the processing device can partition the data into subsets. Depending on the nature of the computing operations, the input data can be partitioned into subsets according to one or more properties of the input data such that each subset has at least one common characteristic that is different from the other subsets, such as the types of the input data, the sources of the input data, the levels of the input data or other properties. The processing device can assign the subsets of data to different processing nodes of the communications grid computing system.

In some example, the processing device examines the sequence of computing operations one by one. For each computing operation in the sequence of operations, the processing device determines whether the computing operation is a linear or not. If the operation is non-linear, the processing device can instruct, or otherwise cause, the processing nodes to communicate with each other to move the data to the assigned processing nodes. The processing nodes may then execute the calculation specified in the current computing operation using the subset of data on the respective nodes. The output results of the computing operation can be saved as the input data for the subsequent computing operation.

If the processing device determines that the operation is linear, the processing device can instruct, or otherwise cause, the processing nodes to execute portions of the computing operation in parallel using local portions of the subsets of data that are already stored in local memories of the processing nodes to generate output results for the computing operation. For instance, the processing nodes can execute the first part of the linear operation based on data currently located on the nodes to generate fragments of the subsets of data, also referred to as subset fragments. The fragments of the subsets of data can then be collected on the assigned nodes so that the assigned nodes can execute the second part of the operation to generate output results for the current operation. Similarly, the output results of the current operation can be saved as the input data for the subsequent operation.

After the sequence of operations are executed, the processing device can have the final output results generated and transmitted to a client computing device associated with a user. For example, the final output results can be presented in a user interface on the client computing device, where the user can view, download, or otherwise access the final output results.

Some examples of the present disclosure improve the distributed computing environments by partitioning the calculations of non-linear operations in a way that can be handled by a distributed computing environment. In particular, by partitioning data into subsets, the distributed computing environment can allocate the non-linear operation to different processing nodes, thereby allowing the subsets of data to be processed in parallel taking advantage of the distributed nature of the distributed computing environment. As a result, the distributed computing environment can efficiently process both linear and non-linear operations.

Some examples of the present disclosure further improve the distributed computing environments by providing a mechanism to allow the distributed computing environment to smoothly switch between linear operations and non-linear operations. By distinguishing linear operations from non-linear operations, the distributed computing environment can further speed up the process of data processing. In particular, by allowing the processing nodes to process data locally for linear operations, the distributed computing environment further reduce the time and network bandwidth consumption associated with transmitting data between processing nodes without impacting the accuracy of the calculation results. Accordingly, any operations, linear, non-linear, or the combination of the linear and non-linear operations can be efficiently and accurately processed by the distributed computing environment.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIGS. 1-10 depict examples of systems and methods usable for visualizing recurrent neural networks according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The computing environment 114 can include one or more processing devices (e.g., distributed over one or more networks or otherwise in communication with one another) that, in some examples, can collectively be referred to as a processor or a processing device.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages for use in visualizing recurrent neural networks, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for visualizing recurrent neural networks to a network-attached data store 110 for storage. The computing environment 114 may later retrieve the data from the network-attached data store 110 and use the data to visualizing recurrent neural networks.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for visualizing recurrent neural networks.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for visualizing recurrent neural networks. For example, the computing environment 114, a network device 102, or both can implement one or more versions of the processes discussed with respect to any of the figures.

Figure 2:
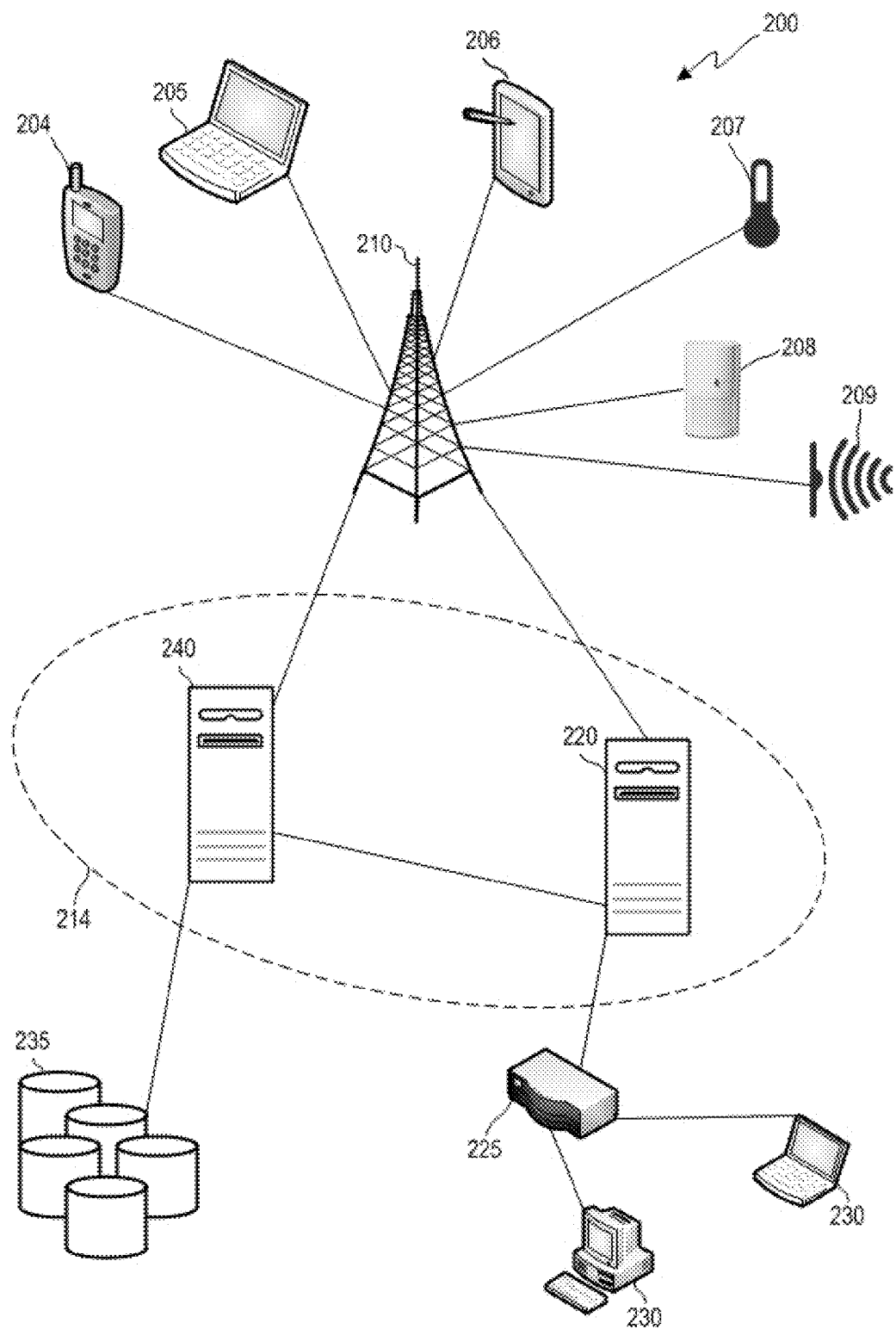
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing (e.g., analyzing the data to visualize a recurrent neural network).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other internetwork or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project for visualizing recurrent neural networks using data, the computing environment 214 can perform a pre-analysis of the data. The pre-analysis can include determining whether the data is in a correct format for visualizing recurrent neural networks using the data and, if not, reformatting the data into the correct format.

Figure 3:
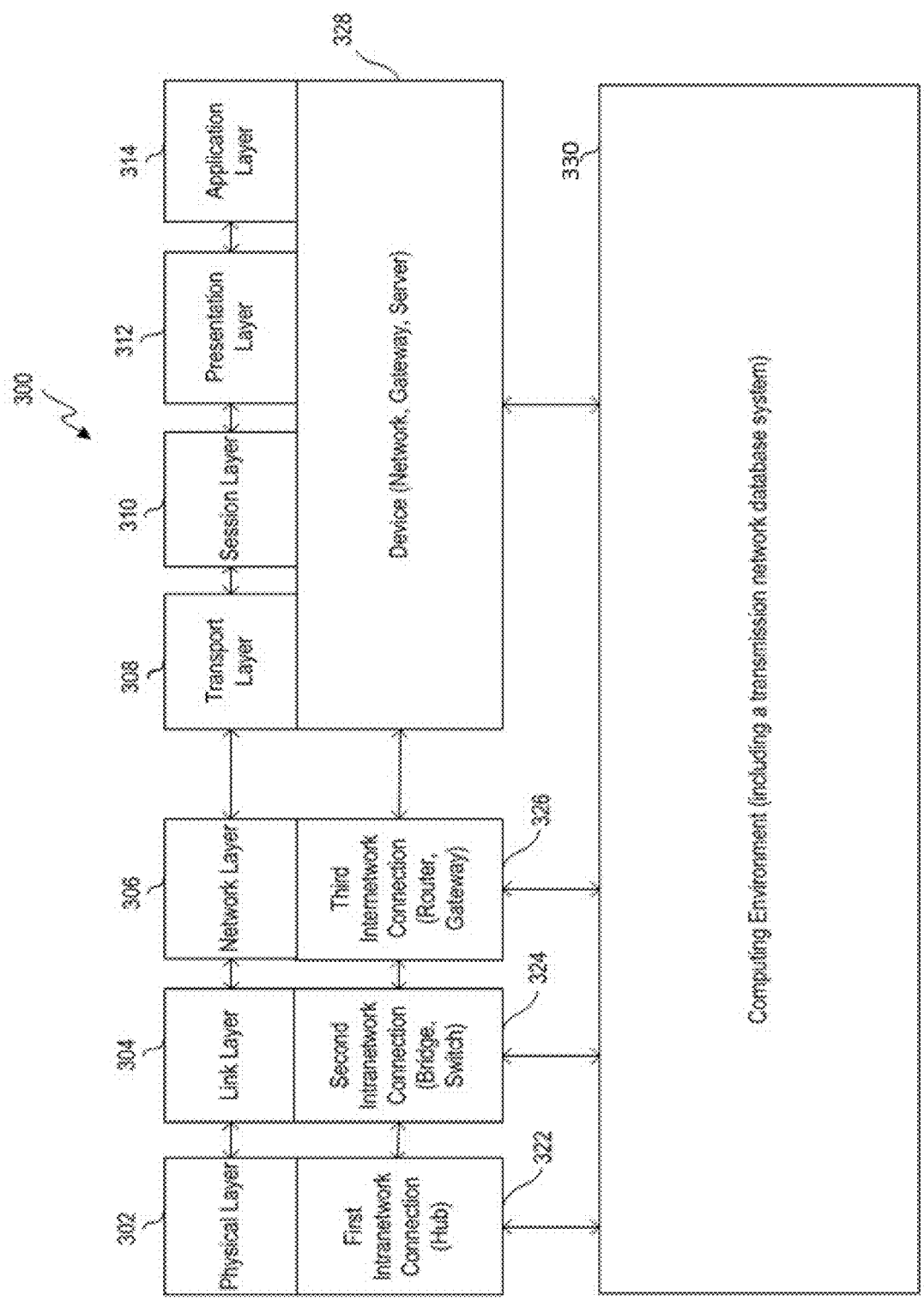
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for visualizing recurrent neural networks, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for visualizing recurrent neural networks.

Figure 4:
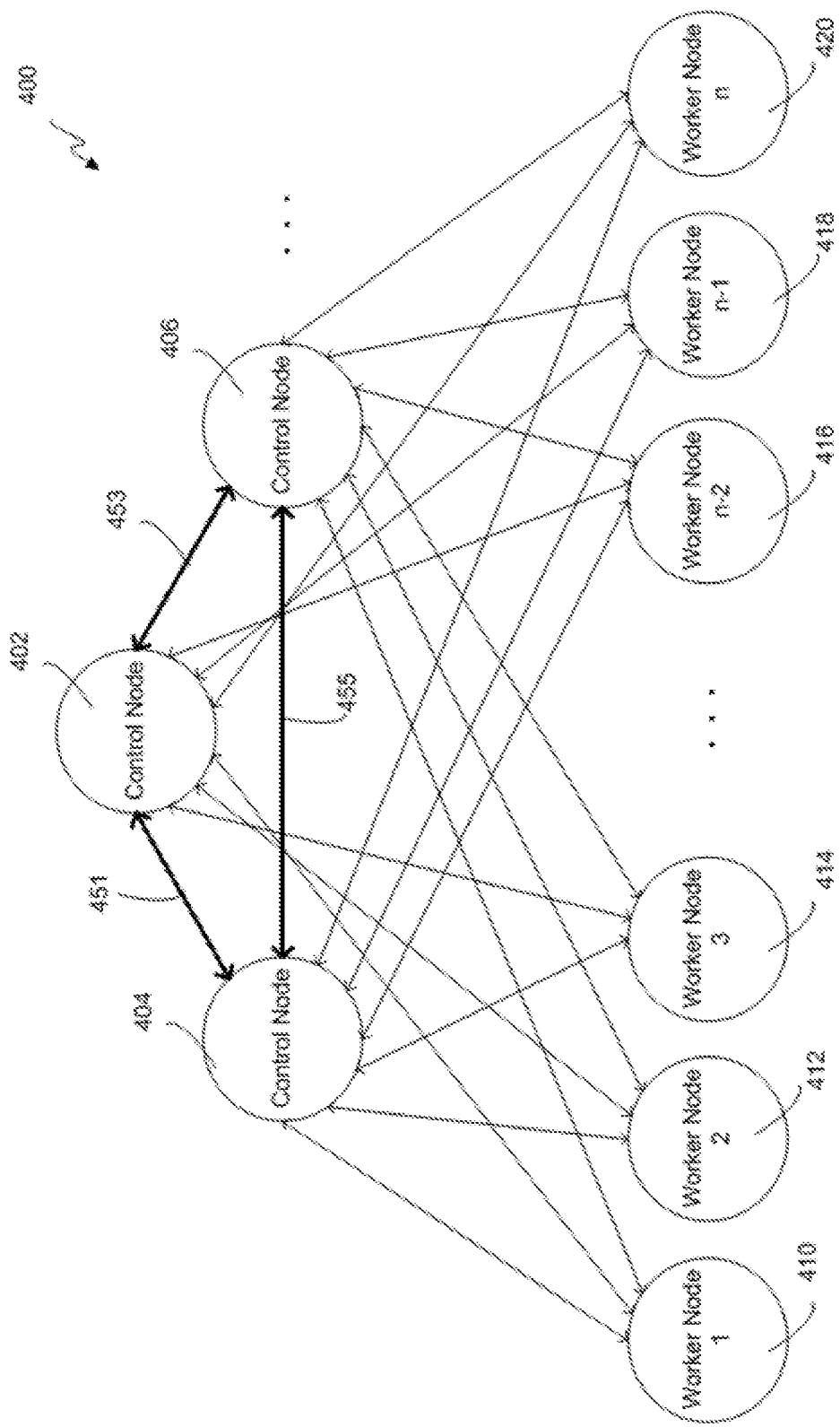
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to visualizing recurrent neural networks. The project may include the data set. The data set may be of any size and can include a time series. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for visualizing recurrent neural networks can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may generate a visualization of a recurrent neural network using at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to generate a visualization of a recurrent neural network.

Figure 5:
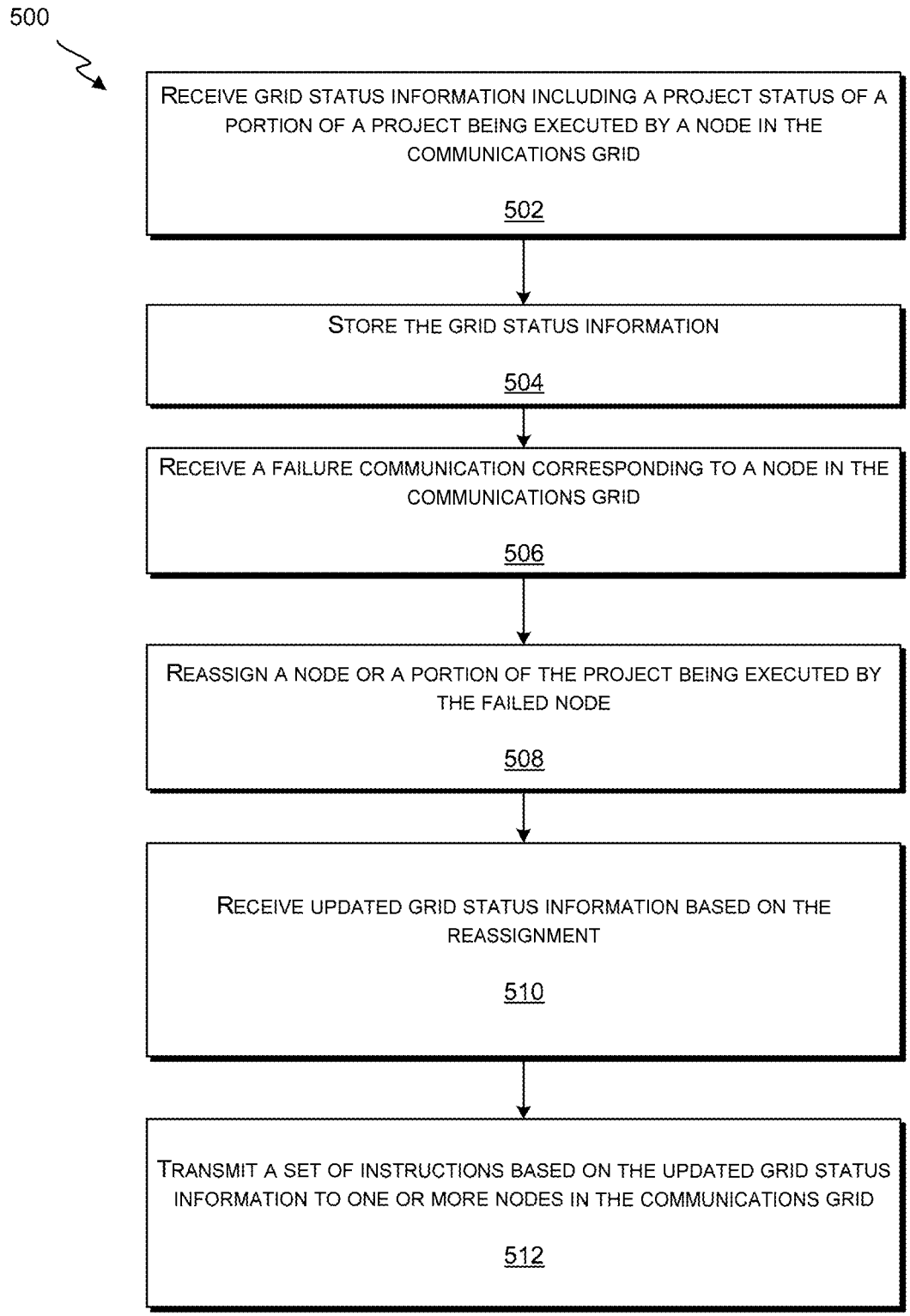
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
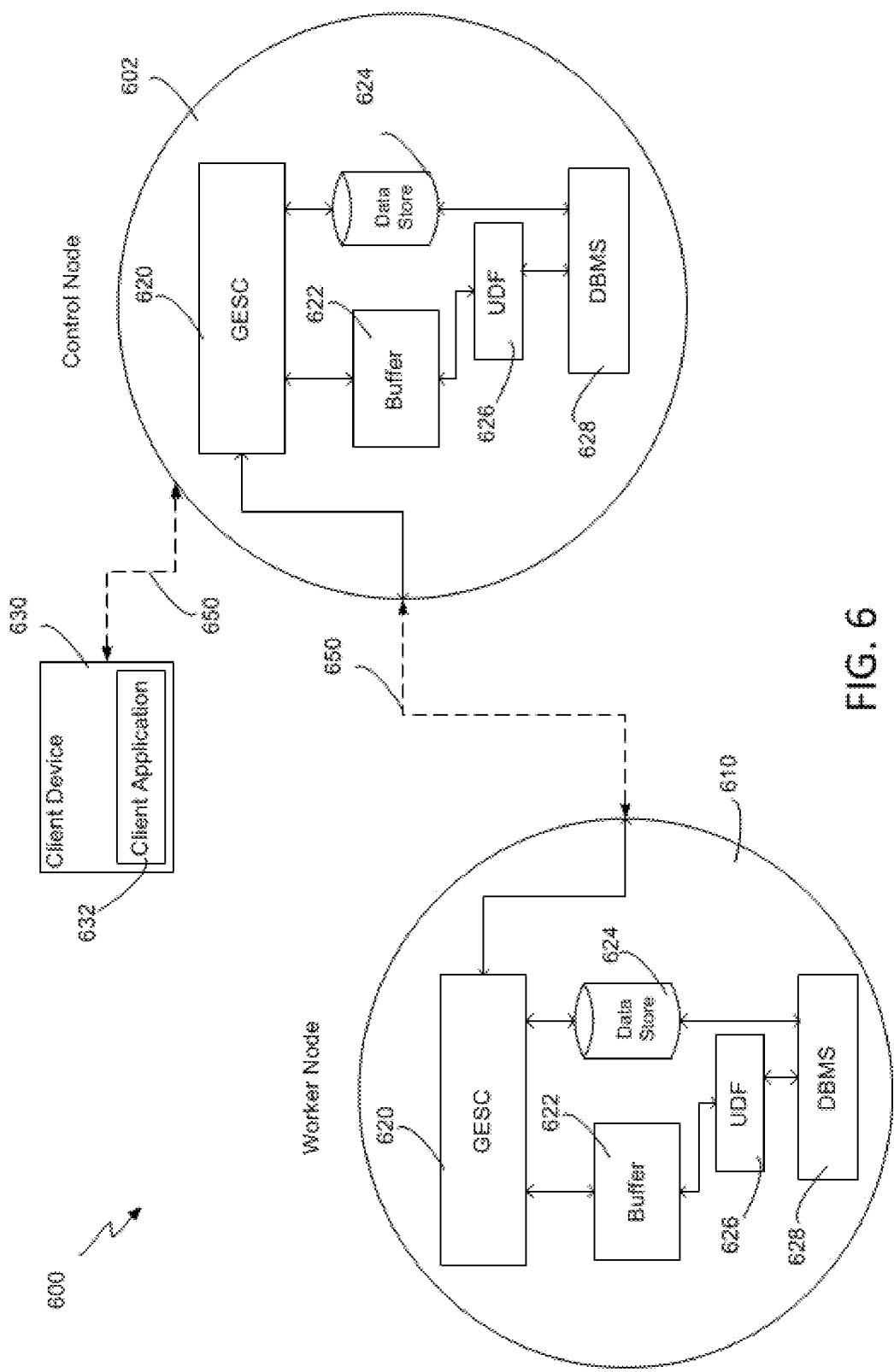
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
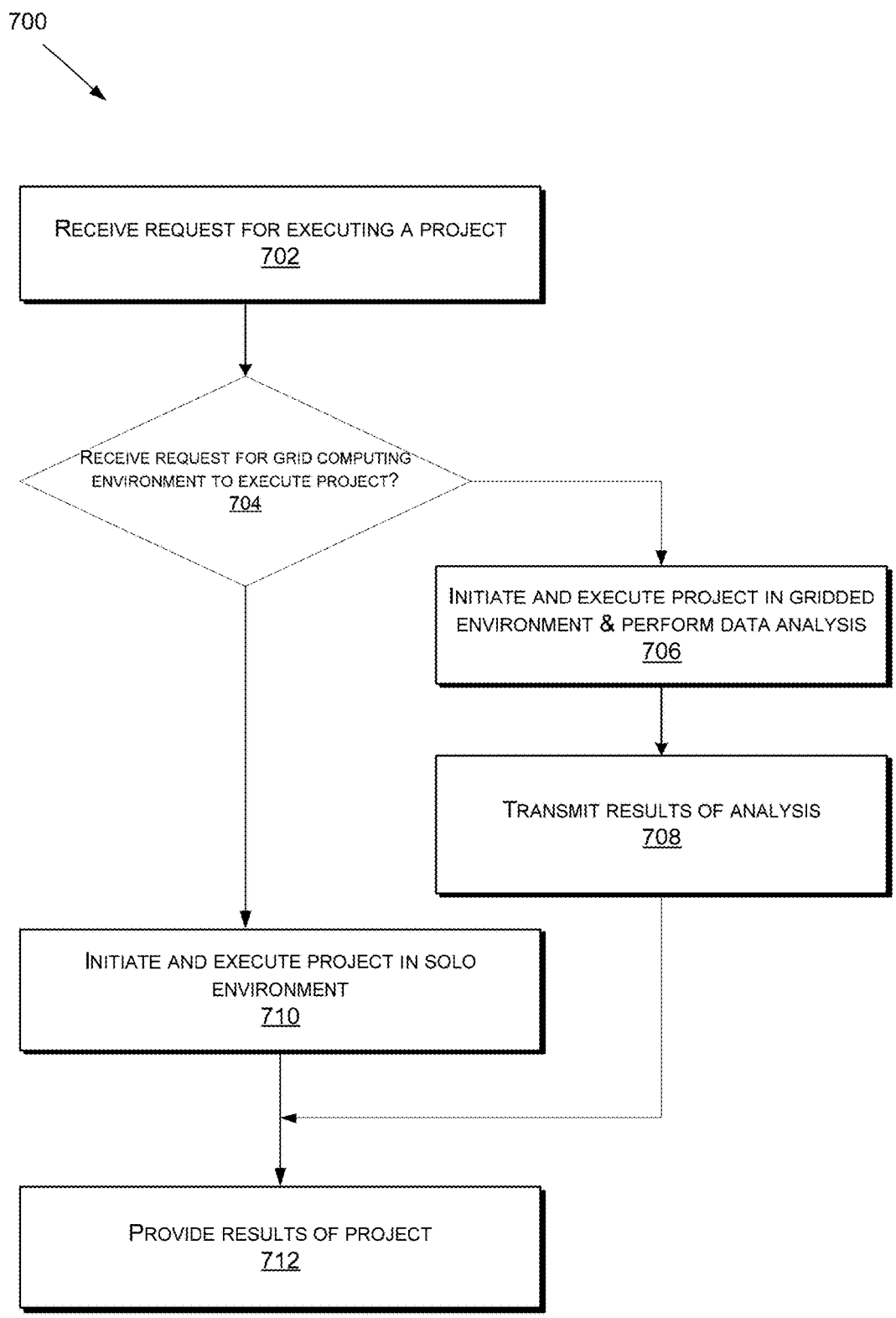
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
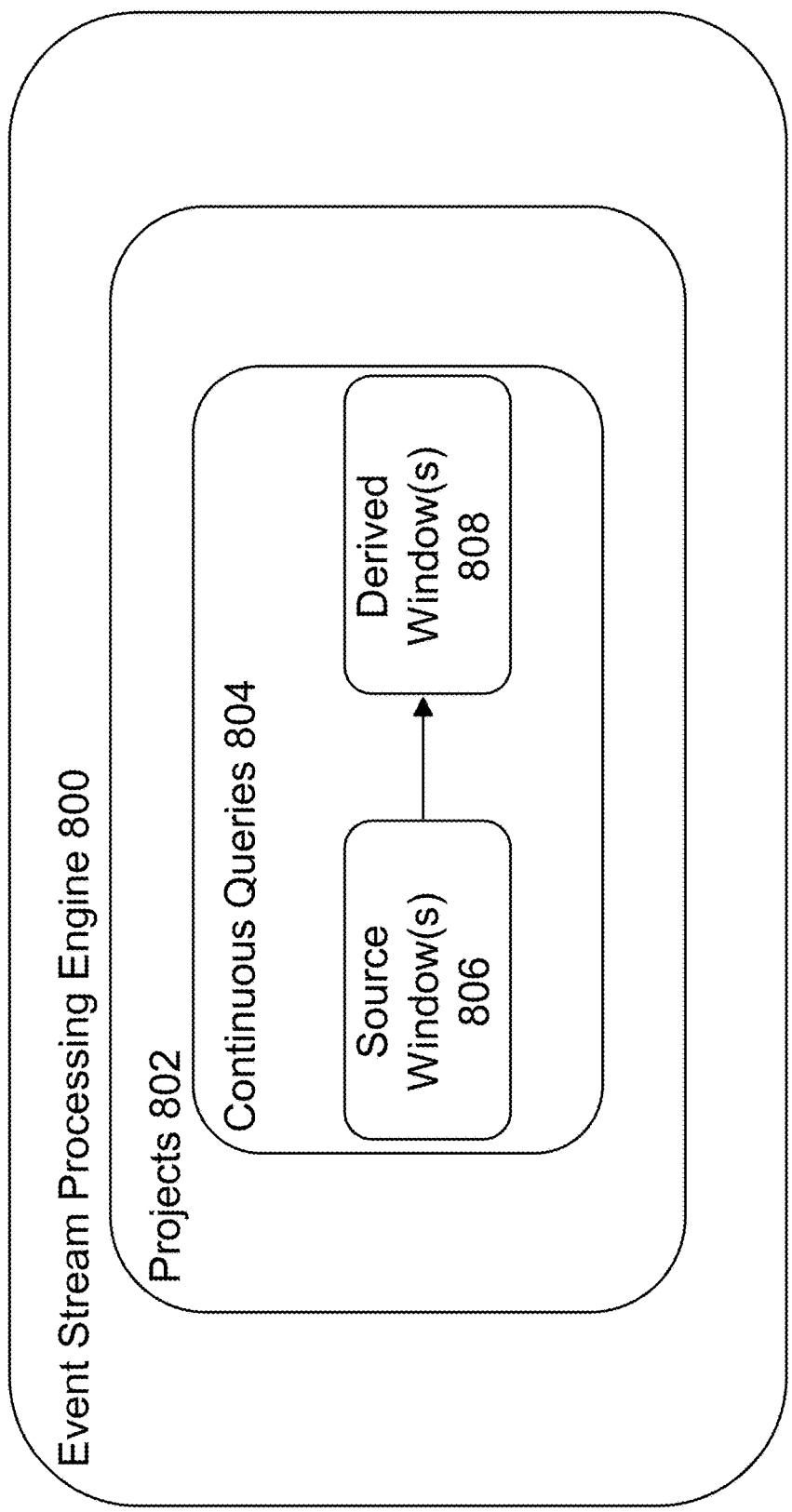
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG.

2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
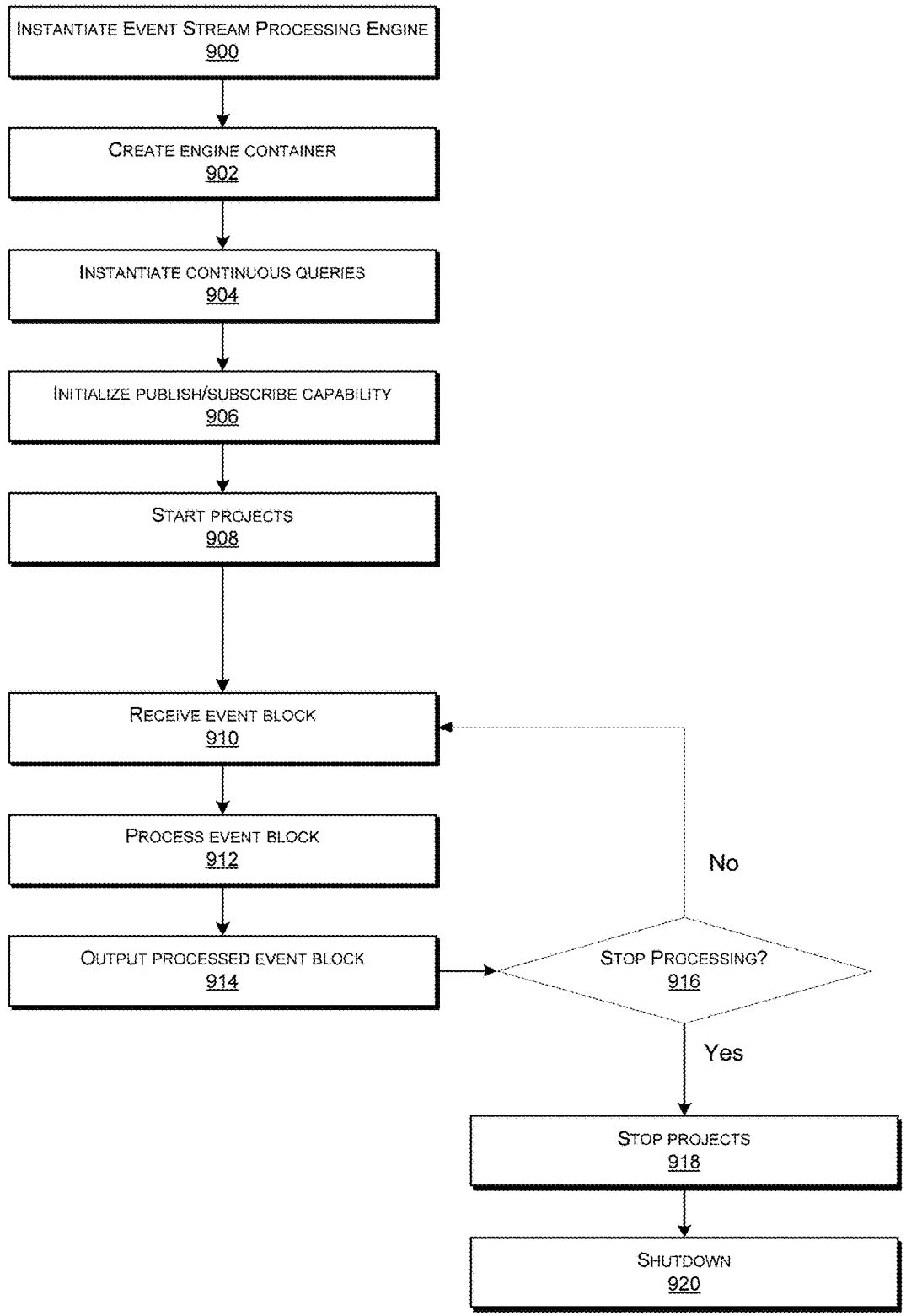
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
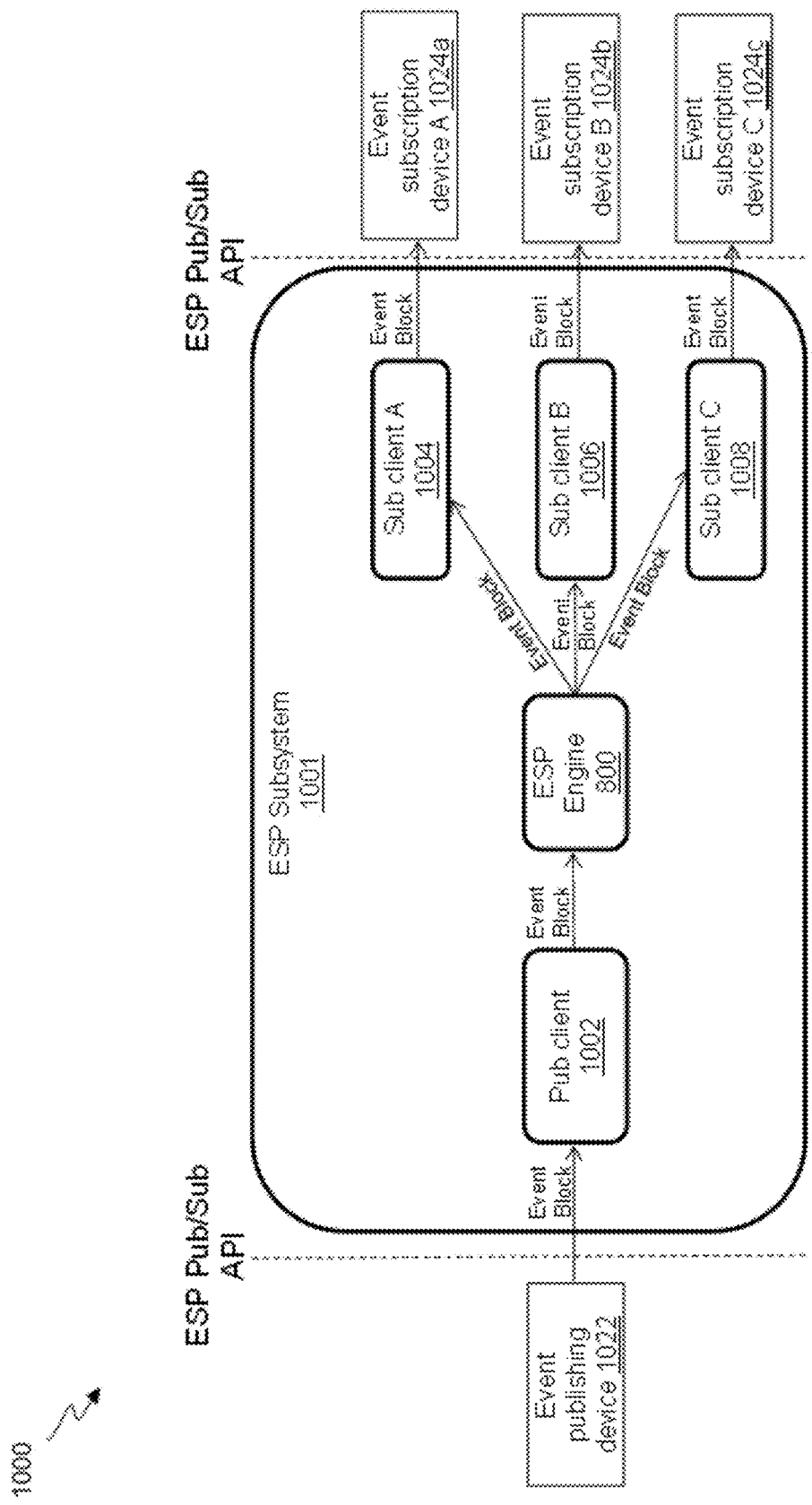
FIG. 10 is a block diagram of an ESP system interfacing between a publishing device and multiple event subscribing devices according to some aspects.

FIG. 10 is a block diagram of an ESP system 1000 interfacing between publishing device 1022 and event subscription devices 1024a-c according to some aspects. ESP system 1000 may include ESP subsystem 1001, publishing device 1022, an event subscription device A 1024a, an event subscription device B 1024b, and an event subscription device C 1024c. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscription device A 1024a, event subscription device B 1024b, and event subscription device C 1024c. ESP system 1000 may include a greater or a fewer number of event subscription devices of event subscription devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscription device A 1024a, event subscription device B 1024b, and event subscription device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscription device A 1024a, event subscription device B 1024b, and event subscription device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscription device A 1024a using the publish/subscribe API. Subscribing client B 1006 may be started by an event subscription application B executing at event subscription device B 1024b using the publish/subscribe API. Subscribing client C 1008 may be started by an event subscription application C executing at event subscription device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscription devices 1024a-c. For example, subscribing client A 1004, subscribing client B 1006, and subscribing client C 1008 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, one or more processors and one or more computer-readable mediums operably coupled to the one or more processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
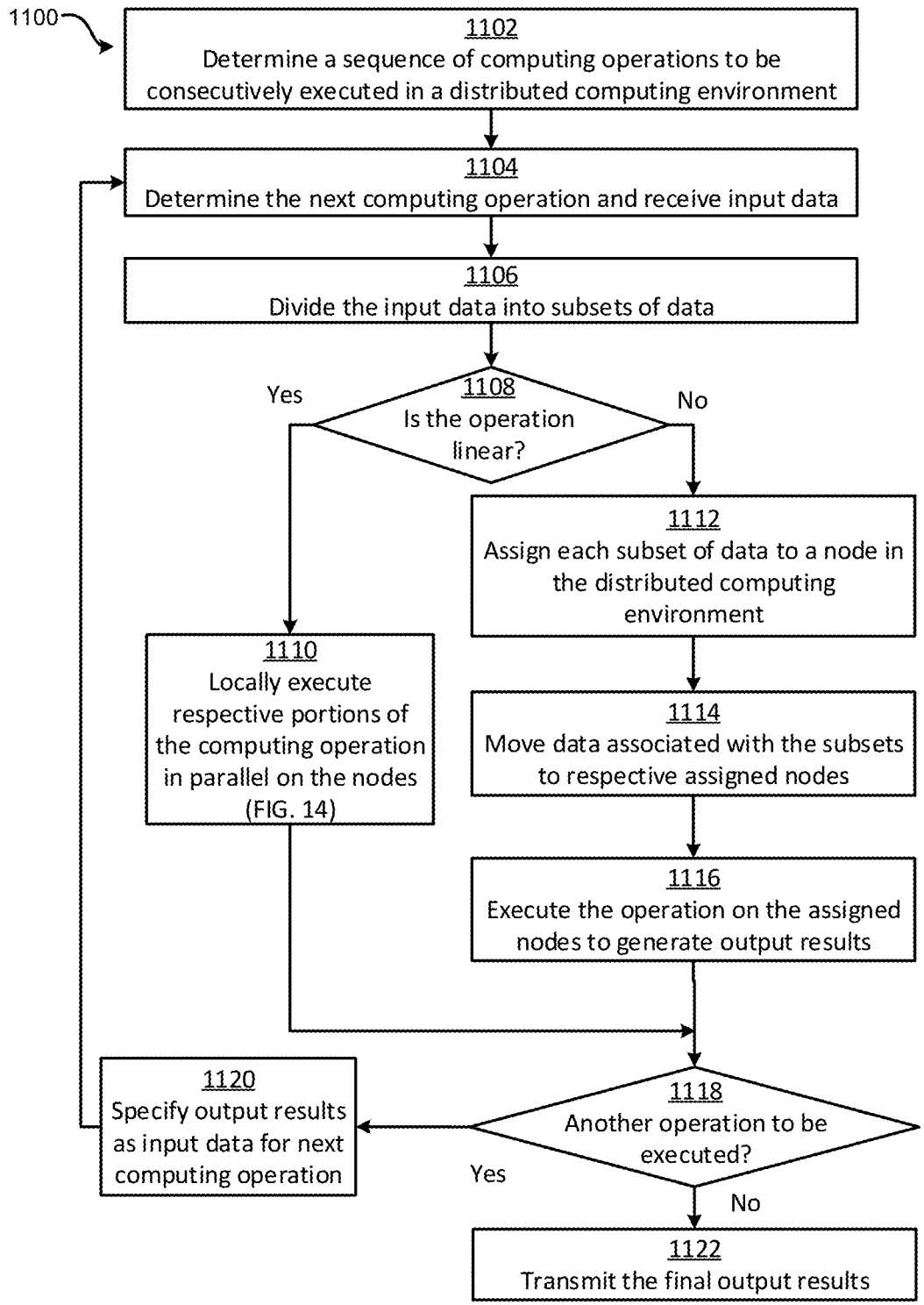
FIG. 11 is a flow chart of an example of a process for executing a sequence of linear and non-linear operations according to some aspects.

FIG. 11 is a flow chart of an example of a process 1100 for executing a sequence of linear and non-linear operations according to some aspects. Some examples can include more steps than, fewer steps than, different steps than, or a different order of the steps shown in FIG. 11. Some examples can be implemented using any of the systems and processes described with respect to FIGS. 1-10.

In block 1102, a processing device determines a sequence of computing operations to be consecutively executed in a distributed computing environment. The sequence of computing operations can be provided through a user input. For example, the processing device can generate a graphical user interface and present the graphical user interface to the user, for example on a client computing device. The user can input the sequence of computing operations through the user interface. Alternatively, the user can select the sequence of computing operations, or at least a portion of the computing operations, from a list of available computing operations. For each of the computing operations, the user can specify, through the user interface for example, the calculations that need to be performed in the operation, the input data to the operation including the data and the type or format of the data, the type or the format of output results, and so on.

In block 1104, the processing device retrieves the next computing operation from the sequence as the current operation to be executed. The processing device can then access the input data for the current operation. For example, the user can specify the input data through a user interface. The input data can then be properly distributed among the processing nodes so that computations can be performed in the manner discussed below. This distribution can be performed randomly or based on a certain partition of the data, such as a partition of the data according to the characteristic of the data (e.g., as described below with regard to block 1106). Alternatively, if the input data is already properly distributed on the processing nodes, then the input data can remain as-is on processing nodes. If the current operation is not the first operation in the sequence, the input data to the current operation may include output results from the previous computing operation.

In block 1106, the processing device partitions the input data into multiple subsets. The partition can be performed, for example, based on the characteristic of the input data. The characteristic of the input data can include the type of the data, the source of the data, the format of the data, and other aspects of the data. The characteristic based on which the input data are partitioned for the current operation can be specified by the user. Alternatively, or additionally, the characteristic for partitioning the data can be determined or derived by the processing device based on the current operation.

For example, if the current operation involves computing a toxic gas emission for each energy plant of a utility, the processing device can determine that the characteristic for partitioning the data can include the energy plant to which the input data relate. The partitioning can thus be performed based on this characteristic so that the input data relating to the same energy plant can be partitioned into the same subset. In another example, if the operation involves computing power consumption for different types of devices in a plant, the processing device can determine that the characteristic for partitioning the input data can include the type of the device that the input data relate to or represent. As a result, input data representing power consumption by a same type of device are partitioned into the same subset, whereas input data representing power consumption of different types of devices are partitioned into different subsets.

Some examples may skip block 1106 for at least one operation in the sequence. For example, if the input data for the first operation in the sequence is distributed among the processing nodes based on the characteristic of the input data, as discussed above with respect to block 1104, then this partitioning step was already inherently performed and block 1106 can be skipped for the first operation.

In block 1108, the processing device determines whether the current operation is linear or not. In some examples, the determination is made based on user input. For example, the user can specify whether a computing operation is linear or non-linear through the user interface when the user provides the sequence of computing operations for execution. In other examples, the determination is made using a look-up table that identifies whether each operation is linear or non-linear. The look-up table can be accessible to the processing device. The processing device can query the look-up table to determine if the current operation is linear or non-linear.

In some examples, the processing device can automatically determine whether an operation is linear or non-linear. For example, the processing device can utilize a machine learning model configured for determining whether an operation provided as input to the machine learning model is linear or non-linear. In another example, the processing device can analyze the operation to determine if the computation in the operation has a basic form, such as $a_0+a_1X_1+a_2X_2+\ldots+a_KX_K$. If the operation involves computation that is not part of the basic form, such as $a_iX_i^2$, then the operation is non-linear. As another example, the processing device can determine whether an operation is linear by examining the rate of the change of the function representing the operation. In one such example, the processing device can generate and feed sample inputs to the function and examine the relationship between the inputs and outputs to determine whether the operation is linear or non-linear. The processing device can determine the operation is a linear operation if a constant rate of change is observed for each of the variables of the function. Otherwise, the operation is a non-linear operation.

If the processing device determines that the current operation is a non-linear operation, the process proceeds to block 1112. Otherwise, the process can proceed to block 1110.

In block 1112, the processing device assigns each subset of data to a processing node in the distributed computing environment so that the processing nodes can process the assigned subsets of data in parallel. The assignment of the subsets to the processing nodes can be made randomly by the processing device. Alternatively, the processing device can determine the assignment based on a number of factors, such as the size of data to be moved, the location of the data, the time spent by a processing node to process the data, etc.

For example, the processing device can determine the assignment of the subsets to the processing nodes based on the location of the data. In order for a processing node to perform the calculation on the subset of data assigned to it, the processing node needs to have the subset of data on the node. As a result, for those pieces of data in the subset that are not on the assigned processing node, they need to be moved to the assigned processing data from their current location. But moving data from one processing node to another processing node can cause delay to the overall execution process and incur additional computational resource consumption, such as CPU time and network bandwidth consumption. So, in some examples the processing device can determine the assignment of the subsets to the processing nodes based on the current location of the pieces of data in the subsets to minimize the total number of data movements among the processing nodes.

In one such example, the processing device can determine the location of each piece of data in each subset. The current location of a piece of data refers to the processing node on which the piece of data is currently stored. Based on the location of these pieces of data in the subsets, the processing device can determine the assignment so that the number of the data movements is minimized. For instance, the processing device can communicate with each processing node to determine which of the processing nodes already has the most pieces of data in the subset. The processing device can then determine that the subset of data is to be assigned to the processing node already having the most pieces of data in the subset. Alternatively, the processing device can use a more advanced approach, like a greedy algorithm or a heuristic algorithm, to determine how to assign the subset of data to reduce the overall number of data movements among the processing nodes. In some examples, the processing device can formulate and solve an optimization problem to determine how to assign a subset of data in order to minimize the overall number of data movements among the processing nodes. Either way, the processing device can assign a subset of data such that only a small number of data movements are required to move the pieces of data in the subset from other processing nodes to the assigned node.

In addition to the location of the data, the processing device can determine the assignment of the subsets to the processing nodes further based on the size of the data to be moved. The processing node can determine the assignment so that the total size of the data being moved is minimized. In a single data movement, a larger size of data being moved leads to a longer moving process and more network bandwidth consumption. As such, by taking into consideration the size of the data being moved can further reduce the network resource consumption and the delay caused by the data movement. It should be understood that in some implementations, the assignment can be determined based on the size of data without considering the number of data movements. In other words, the assignment of the subsets to the processing nodes is determined to minimize the total size of the data being moved as a result of the assignment.

Another factor that the processing device can take into account in determining the assignment can include the processing time of the data on the processing nodes. Although moving data from one processing node to another processing node can cause delay, this delay can be offset by the increase in the speed of data processing at the processing nodes. For example, if a processing node having the majority pieces of data in a subset is much slower in executing the operation than another processing node, it will reduce the overall processing time if the majority pieces of data is moved to the other processing node for execution although the size of the data being moved is larger than the alternative assignment. As such, the processing device can determine the assignment of the subsets to the processing nodes to minimize the execution time of the current operation or the total amount of time spent to finish the execution of the sequence of the computing operations.

The processing device can determine the execution time of each of the processing nodes based on a number of factors. For example, the execution time of an operation on a processing node can be determined based on (i) the processing power of the processing node, such as the speed of the processor installed on the processing node; (ii) the size of the memory of the processing node; or (iii) both of these. The execution time can be further determined based on the current workload of the processing node. It will take a longer time for a powerful but fully loaded processing node to complete the execution of an operation than a less powerful and lightly workload processing node. In addition, the execution time can further depend on the type of the computation involved in the current operation. In some implementations, different processing nodes can configured to execute different types of computations. It is more efficient for a processing node to execute the type of computation for which it is configured than other types of computations. Other factors can be further considered to determine the processing time of the computing nodes.

The processing device can employ a machine learning tool to model the relationships between the various factors discussed above with the processing time on a processing node. Examples of the machine learning tool can include (i) neural networks; (ii) decision trees, such as classification trees and regression trees; (iii) classifiers, such as naïve bias classifiers, logistic regression classifiers, or random forest classifiers; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine learning tools. In one such example, the processing device can provide input into a neural network to receive as output from the neural network a prediction of the processing time associated with a processing node, where the input includes values for one or more of the factors discussed above. Additionally or alternatively, a machine learning tool can be utilized to determine the assignment of the subsets of data to the processing nodes based on the location of the data, the size of the data and the processing time of the operation on each node as discussed above, as well as other factors.

In block 1114, the processing device moves, or instructs the processing nodes to move, the data associated with each of the subsets of data to their corresponding assigned processing nodes.

In block 1116, the assigned processing nodes execute the current operation based on the collected subsets of data to generate output results for the current operation. It should be noted that each of the assigned processing nodes executes a portion of the current operation by executing the operation on a subset of the input data so that the operation can be executed in parallel by these processing nodes.

Referring now back to block 1108, if the processing device determines that the operation is a linear operation (e.g., using one or more of the approached discussed above), the process can proceed to block 1110. In block 1110, the processing device can instruct the processing nodes to locally execute a part of the operation using the pieces of data in the subsets that are already available on the respective processing nodes. The pieces of data that are locally available on a processing node might have previously been distributed to this processing node or collected by the processing node itself (e.g., as described above with respect to block 1104). If the current operation is not the first operation, the pieces of data might include the results from a previous operation in the sequence. Locally executing a part of the operation using the pieces of data available on the respective processing nodes can eliminate the data movement among the processing nodes thereby reducing the execution time of the current operation and the sequence of operations. In addition, because the data in a subset is located at different processing nodes and the execution of the operation is distributed among the processing nodes and performed in parallel, the speed of the execution can be further improved. One example of a process for executing a linear operation is discussed below with reference to FIG. 12.

In block 1118, the processing device determines whether there is another operation in the sequence of computing operations to be executed. If so, the processing device specifies, in block 1120, that the output results of the current operation are to be used as the input data for the next operation in the sequence. The processing device then access the next computing operation in the sequence in block 1104 and the next iteration of the execution process starts. If the processing device determines, in block 1118, that the current operation is the last operation in the sequence and there are no other operations to be executed, in block 1122 the processing device specifies the output results as the final output results. The processing device further transmits the final output results to a client device communicatively coupled to the distributed computing environment, such as a client device associated with the user that provided and requested the execution of the sequence of operations.

Figure 12:
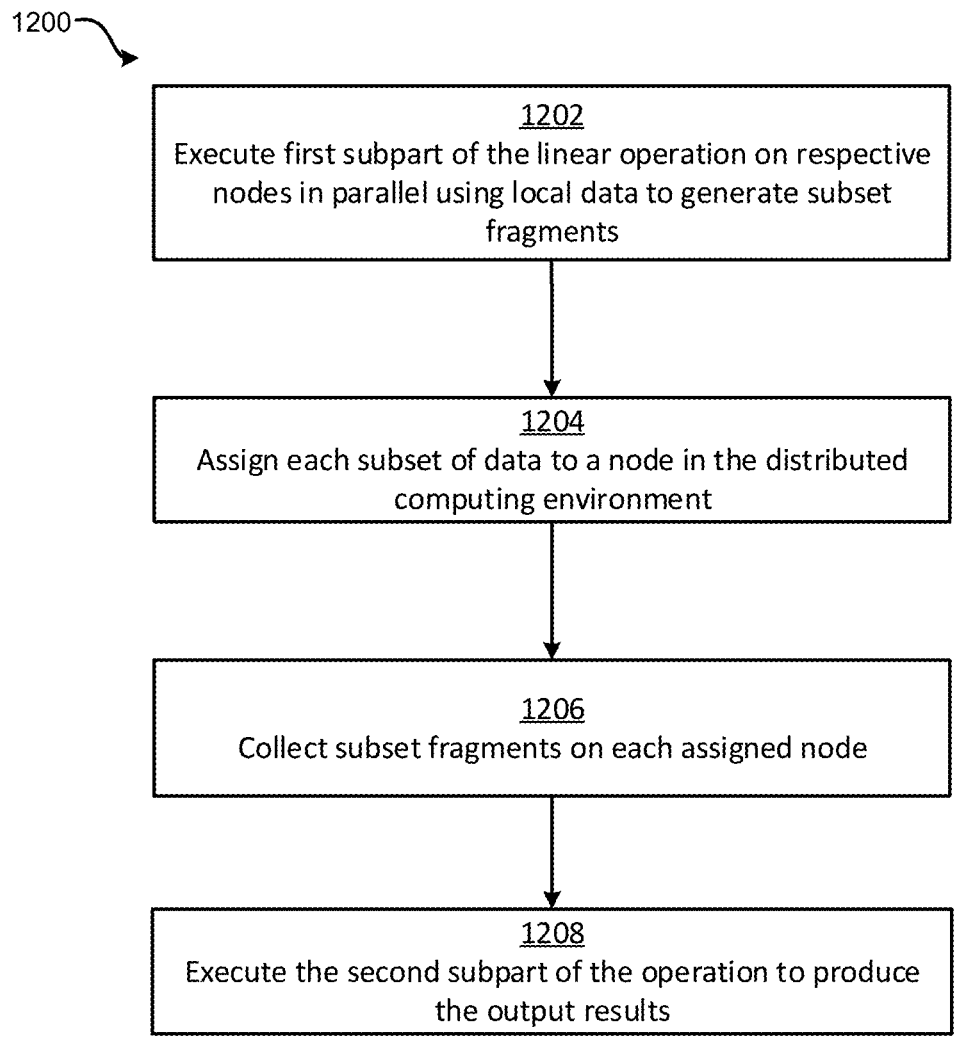
FIG. 12 is a flow chart of an example of a process for executing a linear operation according to some aspects.

FIG. 12 illustrates a flow chart of an example of a process for executing a linear operation according to some aspects. A linear operation can be split into two parts: one part that can be executed on the computing nodes in parallel with pieces of the input data locally available on that node, and a second part that can be performed based on the results of the first part after those results have been collected from all the processing nodes onto a single node. For example, a weighted average is a linear operation and can be split into a first part for calculating a weighted sum and a second part for summing up the results from the first part followed by a division by the sum of the weights. The weighted sum can be performed on each individual node, then those results can be collected on one node and finished by summing those results and dividing by the sum of the weights. Executing a linear operation can thus be performed by executing the first part of the operation followed by the execution of the second part of operation.

In block 1202, the processing device can instruct the processing nodes that have pieces of data in the subset to execute the first part of the linear operation on the respective nodes in parallel. The execution can be performed by using the pieces of data that are available locally to the processing node, i.e., data that are already stored in the local memories of the processing node. Because the first part of a linear operation can be performed in a distributed manner, the operation can be performed without moving data in the subset among the processing nodes. The execution of the first part of the operation can transform the pieces of the input data into intermediate results, referred to as subset fragments herein, which are generally smaller than the input data in term of the data size. For example, a weighted sum operation can convert the several input values into one value which takes smaller memory space than the multiple values in the input.

In block 1204, the processing device assigns each subset of the input data to a processing node in the distributed computing environment. This can be performed similarly as the assigning operation in block 1112 of FIG. 11. For example, the processing device can determine the assignment by considering factors such as locations of the subset fragments, the processing time of the nodes, and others. In one such example, the processing device can assign a subset of data to a processing node that has already had the subset fragments computed so that the number of data movements can be reduced. The processing device can alternatively assign a subset of data to a processing node that can execute the current operation faster than other nodes, or that is configured to execute the type of the current operation. Other factors can additionally or alternatively be considered when determining the assignment of subsets of data to processing nodes in block 1204, for example, the factors discussed above with reference to block 1112 of FIG. 11. And, in some examples, a machine learning tool can be utilized by the processing device to determine the assignment.

In block 1206, the processing device causes the subset fragments to be collected on each of the assigned processing nodes.

In block 1208, the second part of the operation is executed on the assigned node using the collected subset fragments.

In some scenarios, consecutive operations are collapsible, regardless of whether they are linear or non-linear. Consecutive operations are "collapsible" if they can be combined into a single high-level operation that inherently captures each of the individual operations. In these scenarios, the processing device can skip one or more of the consecutive operations and proceed to directly perform the highest-level operation among these consecutive collapsible operations. This can enable the processing device to skip over most of these consecutive operations, such that the abovementioned process (e.g., the steps of FIG. 12) is only performed for a single linear operation, thereby improving processing speeds. For example, a first linear operation can involve finding a maximum value of a first set of numbers (e.g., 1, 2, 3, 4, and 5), a second linear operation can involve finding a maximum value of a second set of numbers (e.g., 6, 7, 8, 9, and 10), and a third linear operation can involve finding a maximum value of the results from the first and second linear operations. Since the third linear operation inherently includes performing the first and second linear operations, all three of these linear operations can be collapsed into a single linear operation, involving finding the maximum value of the union of the first and second sets of numbers. The above process for executing collapsible operations is otherwise identical to executing a single linear operation, but the data may be partitioned differently to reflect the higher level's partitioning. This process of collapsing consecutive operations is performed based on the assumption that the results from the intermediate operations were not requested by the user (e.g., that the user did not request the results from the first linear operation and/or the second linear operation). If the user does request the results from one or more of the intermediate operations, the processing device will execute these intermediate operations separately.

FIG. 13 shows an example of a sequence of operations to be executed by the distributed computing environment. This example involves calculating emissions, i.e., the toxic gas produced in the process of generating energy. When a power plant uses a fossil fuel like coal or natural gas to make electricity, a byproduct is emissions like sulfur dioxide ($SO_2$) and nitrogen oxide (NOx). Countries often have policies to monitor and manage the amount of emissions produced. Determining how much emission is produced at the country level involves a sequence of operations.

As shown in FIG. 13, the sequence of operations 1302 includes a first operation of calculating emission for each plant of each utility company, a second operation of calculating emission for each utility in each country, and a third operation of calculating emission for each country. As discussed above, the sequence of operations 1302 can be input by a user via a user interface. Similarly, the user can specify the input data for each of the operations in the sequence as shown in FIG. 13.

For example, the user can specify the emission by generating units in each plant as input data and the formula for generating the emission per plant in the first operation as follows:

$$EP_k = \sum_{i=1}^{N_k} EU_{ki} - 30\% \times \max_{j \in J, J \in \{1,\ldots,N_k\} \text{ and } |J|=3} \sum_{j} g(EU_{kj}, 0), \quad (1)$$

where $EP_k$ is the emission of plant k; $EU_{ki}$ is the emission of unit i in plant k; $N_k$ is the number of units in plant k; J is a set containing three elements taken from $\{1, \ldots, N_k\}$. g(x) is a function that outputs value x if the unit associated with x was built before 1980 and outputs 0 otherwise. In other words, the emission for a plant is calculated as the sum of the emission of the units in that plant with certain emission reductions. If a plant contains a scrubbing unit, the emission reduction is recognized at the plant level and the reduction can offset up to a maximum 30% of the total emissions for up to three units at a plant. Further, units built before 1980 are not allowed to contribute to the sum to calculate the reduction. As such, the operation in Equation (1) finds the maximum combination of emission by three units to determine the reduction. The user can further label, or the processing device can detect, that the operation in Equation (1) is a non-linear operation.

Calculating the emission per utility in the second operation can involve the following calculation by using the emission by plants in each utility as input data:

$$ET_q = \begin{cases} \sum_{i=\lfloor 60\% \times M_q \rfloor+1}^{M_q} \widehat{EP}_{qi}, & \text{if } \sum_{i=1}^{\lfloor 60\% \times M_q \rfloor} \widehat{EP}_{qi} < \text{offset}_q \\ \sum_{i=1}^{M_q} \widehat{EP}_{qi} - \text{offset}_q, & \text{if } \sum_{i=1}^{\lfloor 60\% \times M_q \rfloor} \widehat{EP}_{qi} \geq \text{offset}_q \end{cases} \quad (2)$$

where $ET_q$ is the emission of utility q; $M_q$ is the number of plants in utility q; $\widehat{EP}_{qi}$ is emission of plants in utility q ranked in descending order. $\lfloor x \rfloor$ is the floor of a real value x, i.e. the highest integer value that is smaller than or equal to x. In this operation, each utility has offset credits, denoted as $\text{offset}_q$, that they have earned or traded. These credits can be used to offset the emissions of the plants. However, the utility may only offset emissions for up to 60% of their plants. As such, if the top 60% of the plants in utility q have a total emission that is less than $\text{offset}_q$, the emission of utility q would be the sum of the emission for the rest of the plants, i.e. plant $\lfloor 60\% \times M_q \rfloor+1$ to plant $M_q$. If the top 60% of the plants in utility q have a total emission that is higher than $\text{offset}_q$, the emission of utility q can be calculated as the sum of the emission of all the plants of utility q minus the $\text{offset}_q$. Again, the user can label, or the processing device can detect, that the operation in Equation (2) is a non-linear operation.

At the country level, the operation can be performed, using the emission by utilities as input data, via correlated aggregation of emissions by utilities. The operation can be formulated as follows:

$$EC_r = \sqrt{\sum_{i=1}^{N_r} \sum_{j=1}^{N_r} \langle ET_{ri}, ET_{rj} \rangle} \quad (3)$$

where $EC_r$ is the emission by county r; $N_r$ is the number of utilities in country r; and $\langle ET_i, ET_j \rangle$ is the correlation between the emission by utilities i and j in county r. The correlation can be performed, for example as a summation of the product of correlation parameter and the emission by the utilities. This operation can be labelled by the user or by the processing device as a non-linear function.

To execute the sequence of computing operations 1302 shown in FIG. 13, the example process shown in FIG. 11 can be employed using one iteration for one operation. The execution process will be described in conjunction with FIG. 14 which illustrates an example of data movement between processing nodes in different iterations of the calculation of a sequence of non-linear operations.

Figure 14:
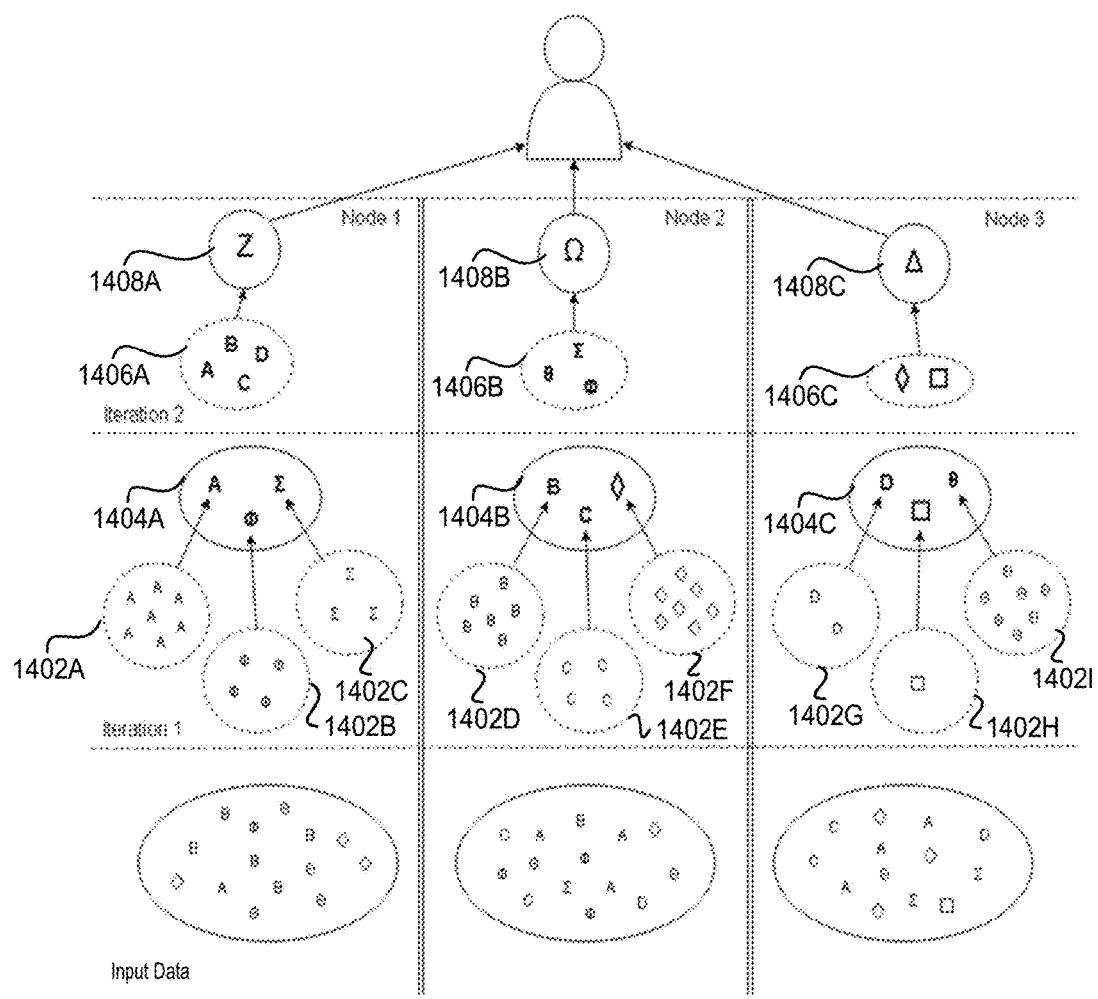
FIG. 14 is an example of data movement between nodes in different iterations of the calculation of a sequence of non-linear operations according to some aspects.

In iteration 1, the operation formulated in Equation (1) is executed. The input data to this operation are emission amounts at the generation unit level, i.e. $EU_i$, i=1, . . . N, where N is the total number of plants in the system. In FIG. 14, the input data $EU_i$ are located on three processing nodes. As discussed above with regard to FIG. 11, the input data may have previously been distributed to these processing nodes by the processing device randomly or based on a specific partition. Alternatively, the input data may be collected by and stored on the respective processing nodes. The various symbols in the input data represent the characteristic of the data. In this example, the characteristic of the data includes the power generation units to which these emission data $EU_i$ relate.

The processing device partitions the input data $EU_i$ into subsets based on characteristic of the input data. In this example, the input data are partitioned into subset each subset representing a power generation unit. In other words, the data $EU_i$ in a particular subset contain the emission data for a corresponding generation unit. The processing device assigns the subsets of data to the processing nodes in the distributed computing environment, which include node 1, node 2 and node 3 in the example illustrated in FIG. 14. Based on the assignment, pieces of data in the subset are moved to the assigned processing node. For example, pieces of data denoted by "A" can represent $EU_i$ that belong to plant A; pieces of data denoted by "B" represent $EU_i$ that belong to plant B, and so on.

As shown in FIG. 14, the subset of data for plant A is assigned to node 1, and thus pieces of data "A" are moved from the processing nodes to node 1. Note that some of the pieces of the emission data "A" were stored on node 1 before the move, while others are stored on node 2 and node 3. Those pieces of data "A" are moved to node 1 to form the subset "A." Other subsets, such as subsets B, C, D, $\phi$, $\Sigma$, . . . can be moved in a similar way.

By moving the pieces of data in a subset to the corresponding assigned node, the processing device can instruct the respective nodes to execute the operation using the subsets of data 1402A-1402I, indicated using dotted circle in FIG. 14. In this example, node 1 can execute the operation in Equation (1) based on subset "A" to calculate the amount of emission for plant A, i.e $EP_A$. Node 1 can also execute the operation in Equation (1) based on subset "$\phi$" to calculate the amount of emission for plant $\phi$, i.e $EP_\phi$. Node 2 can, in parallel to node 1, execute the operation in Equation (1) based on subset "B" to calculate the amount of emission for plant B, i.e $EP_B$. Similarly, other subsets of data can be utilized by the nodes to execute Equation (1). The output results 1404A-1404C are indicated by circles in FIG. 14.

Since there are more operations to be executed in the sequence of operations 1302, the processing device specifies the output results 1404 of the current operation as the input data for the next operation, i.e. the calculation of emission by utilities according to Equation (2). As shown in FIG. 14, the output results 1404 from iteration 1 is again partitioned into subsets and assigned to the processing nodes. Pieces of data in the subsets 1406A-1406C are moved to the assigned nodes so that the corresponding node can execute the operation in Equation (2) to generate output results 1408A-1408C. Another iteration (not shown in FIG. 14) can be performed by the processing device to execute the third operation formulated in Equation (3) in a way similar to the first two iterations.

FIG. 15 shows another example of a sequence of operations to be executed by the distributed computing environment. In this example, the toxic gas emission per country is again calculated. The operations in the sequence of operations, however, are different. As shown in FIG. 15, the sequence of operations 1502 includes a first operation of calculating emission for each plant of each utility company, a second operation of calculating emission for each utility in each country, a third operation of calculating emission for each parent holding company, and a fourth operation for calculating emission for each country. The user can specify the input data for each of the operations in the sequence as shown in FIG. 15.

For the first operation, the user can specify the emission by generating units in each plant as input data and the formula for generating the emission per plant in the first operation as follows:

$$EP_k = \frac{\sum_{i=1}^{N_k} w_{kl} EU_{ki}}{\sum_{i=1}^{N_k} w_{kl}}. \tag{4}$$

Again, $EP_k$ is the emission of plant k; $EU_{ki}$ is the emission of unit i in plant k; $N_k$ is the number of units in plant k; $w_{kl}$ is the weight for unit i in plant k, which is a constant determined based on the emission type and the type of power source. The user can label, or the processing device can detect, that the operation in Equation (4) is a linear operation.

Calculating the emission per utility in the second operation can involve the following summation calculation by using the emission by plants in each utility as input data:

$$ET_q = \sum_{i=1}^{M_q} EP_{qi} \tag{5}$$

where $ET_q$ is the emission of utility q; $M_q$ is the number of plants in utility q, $EP_{qi}$ is the emission of plant i in utility q. Similarly, calculating the emission per parent holding company in the third operation can involve the summation of the emission by utilities in the parent holding company, as follows:

$$EH_p = \sum_{i=1}^{S_p} ET_{pi} \tag{6}$$

where $EH_p$ is the emission of parent holding company p; $S_p$ is the number of utilities in parent holding company p, $ET_{pi}$ is the emission of utility i in parent holding company p. Both operations in Equations (5) and (6) are linear operation.

The fourth operation in the sequence of operations 1502 can be performed, using the emission by parent holding companies as input data, via correlated aggregation of emissions by parent holding companies. The operation can be formulated as follows:

$$EC_r = \sqrt{\sum_{i=1}^{N_r} \sum_{j=1}^{N_r} \langle EH_{ri}, EH_{rj} \rangle} \qquad (7)$$

where $EC_r$ is the emission by county r; $N_r$ is the number of parent holding companies in country r; and $\langle EH_i, EH_j \rangle$ is the correlation between the emissions by parent holding companies i and j in county r. The correlation can be performed, for example as a summation of the product of correlation parameter and the emission by the parent holding companies. This operation can be labelled by the user or by the processing device as a non-linear function.

To execute the sequence of computing operations 1502 shown in FIG. 15, the example process shown in FIG. 11 can be employed using one iteration for one operation. The execution process will be described in conjunction with FIG. 16 which illustrates an example of data movement between processing nodes in different iterations of the calculation of a sequence of linear and non-linear operations.

Figure 16:
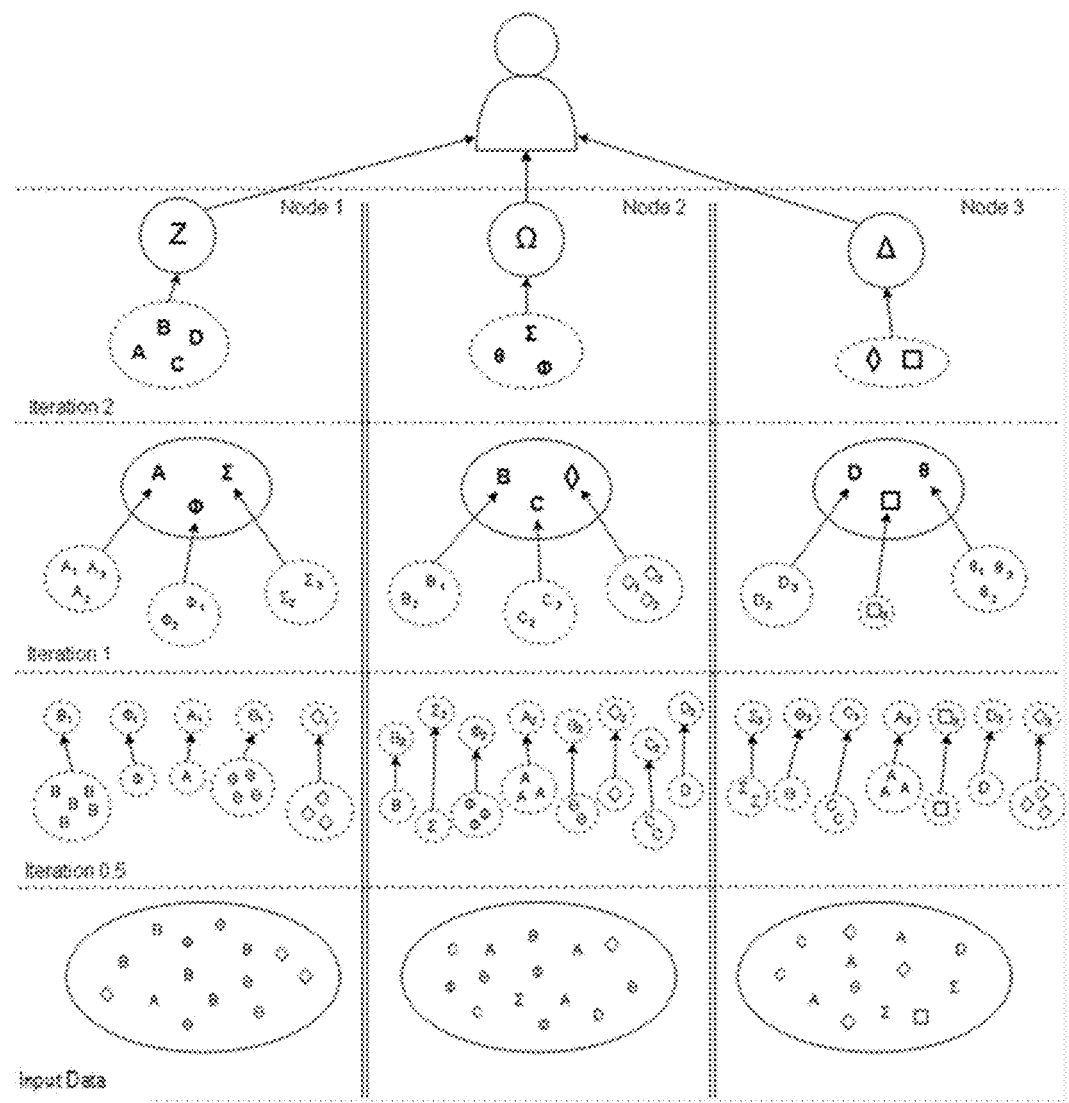
FIG. 16 is an example of data movement between nodes in different iterations of an improved calculation of a sequence of linear and non-linear operations according to some aspects.

In iteration 1, the operation formulated in Equation (4) is executed. The input data to this operation are emission amounts at the generation unit level, i.e. $EU_i$, i=1, . . . N, where N is the total number of plants in the system. Similar to FIG. 14, the raw data shown in FIG. 16 represent the input data $EU_i$ and are located on three processing nodes. The various symbols in the raw data represent the power generation units to which these emission data $EU_i$ belong.

Because the operation in Equation (4) is a linear operation, block 1110 and the example process shown in FIG. 12 can be employed so that at least part of the operation can be executed in parallel on the processing nodes. Specifically, the processing device partitions the input raw data $EU_i$ into subsets with each subset representing a power generation unit. The processing device causes the first half of calculation in Equation (4) to be executed locally at the respective processing nodes based on the data available at each processing node, i.e., determining a weighted sum of the emissions by multiplying each emission by its weight and summing those terms. This process is shown as iteration 0.5 in FIG. 16 where the data is locally processed to generate subset fragments denoted as B1, A1, B2, A2 in FIG. 16.

In order to execute the second part of the operation, the processing device assigns each subset, and thus the associated subset fragments to a processing node. If there are more subsets than the processing nodes, some subsets will be assigned the same processing node. Based on the assignment, subset fragments are moved to the assigned processing nodes to generate the output results for the current operation as indicated in iteration 1 in FIG. 16. In this example, the total weighted sum of plant emissions is determined at each processing node for the corresponding plant by adding each weighted sum of emissions. Separately, each processing node also determines the total of the weights for the corresponding plant, and finishes the weighted average shown in Equation (4) by dividing the weighted sum of emissions by the total of the weights.

The next two operations, i.e., Equations (5) and (6), in the sequence of operations 1502 are both linear operations, and the processing device can determine that these two operations are collapsible. As discussed above, for collapsible consecutive operations, the processing device can skip to the highest level of operation. In this example, the processing device can skip the calculation of the emission at the utility level and proceed with calculating the emission for the parent holding companies. Similar to the process of executing a linear operation, the processing device instructs the first half of calculation to be executed on each processing node, i.e., determining the node-specific total amount of emissions for each parent holding company by adding the plant emissions values together on that node to generate subset fragments. The processing device then assigns each parent holding company to a processing node. The subset fragment is distributed among the processing nodes so that subset fragments for all plants of a parent holding company are gathered on the assigned processing node. The respective processing nodes may then execute the second part of the operation by adding the emission for the parent holding company. The fourth operation in the sequence of operation 1502, i.e., Equation (7), can be performed in a way similar to Equation (3) as described above with respect to FIGS. 13 and 14.

In some implementations, the processing device can generate and present a user interface to a user via a client device so that the user can selectively view and explore the output results from any computing operation of the sequence of computing operations. For example, the user interface can present a list, a table, a tree or other types of user interface controls with which the user can interact to select an operation for which the user wants to view the output results. In addition, the processing device may also allow the user to request the output results at any stage in the sequence of the operations, such as through the user interface. By receiving the request, the processing device may stop the execution early and calculate and deliver the request output results.

Traditional aggregation performs a calculation on each computing node before sharing those results with other nodes and finishing the calculation for each subset of the partition. The traditional aggregation is thus restricted to executing calculations that can be computed in two parts, such as a linear operation and also restricted to a single calculation at all levels. The disclosure presented herein allows a user to specify any calculation at any level in the series of calculations. In addition, the disclosure presented herein allows the user to re-partition and re-distribute subsets for every operation and to redefine the partition in each calculation of the sequence.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
A processor; and
a memory comprising instructions that are executable by the processor for causing the processor to:
receive a sequence of computing operations to be consecutively executed in a distributed computing environment formed from a plurality of nodes;
for each computing operation in the sequence of computing operations:
receive input data for the computing operation;
partition the input data into subsets such that each subset has at least one common characteristic that is different from the other subsets;
determine whether the computing operation is linear or non-linear;
in response to determining that the computing operation is non-linear:
assign the subsets to respective nodes among the plurality of nodes;
cause the subsets to be transmitted to the respective assigned nodes; and
cause the plurality of nodes to execute respective portions of the computing operation in parallel on the subsets to generate output results for the computing operation; and
in response to determining that the computing operation is linear:
cause the plurality of nodes to execute respective portions of the computing operation in parallel using local portions of the subsets that are already stored in local memories of the plurality of nodes to generate output results for the computing operation; and
transmit final output results to a client device communicatively coupled to the distributed computing environment, the final output results being the output results from a last computing operation in the sequence of computing operations.

2. The system of claim 1, wherein the output results of each computing operation at least partially form subsequent input data for a subsequent computing operation in the sequence of computing operations.

3. The system of claim 1, wherein determining whether the computing operation is linear or non-linear comprises automatically determining whether the computing operation is linear or non-linear using a machine-learning tool.

4. The system of claim 1, wherein the memory further includes instructions that are executable by the processor for causing the processor to: generate a graphical user interface through which a user can provide user input specifying (i) the sequence of computing operations and (ii) whether each computing operation in the sequence of computing operations is linear or non-linear; and determine whether the computing operation is linear or non-linear based on the user input.

5. The system of claim 4, wherein the memory further includes instructions that are executable by the processor for causing the processor to: enable a user to selectively view and explore the output results from each computing operation among the sequence of computing operations by interacting with the graphical user interface via the client device.

6. The system of claim 1, wherein the memory further includes instructions that are executable by the processor for causing the processor to assign the subsets to the respective nodes among the plurality of nodes by, for each piece of data in each subset: determining a current location of the piece of data, the current location being a particular node among the plurality of nodes on which the piece of data is currently stored; and determining an assignment for the piece of data based on the current location of the piece of data, wherein the assignment is configured to minimize a total number of data movements among the plurality of nodes.

7. The system of claim 6, wherein the memory further includes instructions that are executable by the processor for causing the processor to determine the assignment for the piece of data based on a size of the piece of data in memory.

8. The system of claim 1, wherein the memory further includes instructions that are executable by the processor for causing the processor to: determine how long it will take a node among the plurality of nodes to execute at least a portion of the computing operation; and assign the subsets to the respective nodes based on how long it will take the node to execute the at least the portion of the computing operation in order to minimize a total amount of time spent to finish executing the sequence of computing operations.

9. The system of claim 1, wherein the memory further includes instructions that are executable by the processor for causing the processor to: determine that at least two computing operations in the sequence of computing operations are collapsible, wherein the at least two computing operations are collapsible if they are consecutive in the sequence of computing operations and linear; and in response to determining that the at least two computing operations in the sequence of computing operations are collapsible, cause the plurality of nodes to only execute a latest computing operation among the at least two computing operations and skip one or more earlier computing operations among the at least two computing operations, wherein the latest computing operation is later in the sequence of computing operations than the earlier computing operations.

10. The system of claim 1, wherein the memory further includes instructions that are executable by the processor for causing the processor to, in response to determining that the computing operation is a linear operation: determine that the computing operation includes two or more subparts that collectively form the computing operation; cause the plurality of nodes to execute a first subpart among the two or more subparts using the local portions of the subsets that are already stored in the local memories to generate subset fragments that are distributed among the plurality of nodes; cause the subset fragments to be redistributed among the plurality of nodes such that, for each respective subset, all of the subset fragments related to the respective subset are collected on a respective node among the plurality of nodes to which the respective subset is assigned; and subsequent to redistributing the subset fragments among the plurality of nodes, cause the plurality of nodes to execute a second subpart among the two or more subparts on the subset fragments to generate the output results for the computing operation.

11. A non-transitory computer-readable medium comprising instructions that are executable by a processing device for causing the processing device to:
receive a sequence of computing operations to be consecutively executed in a distributed computing environment formed from a plurality of nodes;
for each computing operation in the sequence of computing operations: receive input data for the computing operation;
partition the input data into subsets such that each subset has at least one common characteristic that is different from the other subsets;
determine whether the computing operation is linear or non-linear;
in response to determining that the computing operation is non-linear:
assign the subsets to respective nodes among the plurality of nodes;
cause the subsets to be transmitted to the respective assigned nodes; and
cause the plurality of nodes to execute respective portions of the computing operation in parallel on the subsets to generate output results for the computing operation; and
in response to determining that the computing operation is linear:
cause the plurality of nodes to execute respective portions of the computing operation in parallel using local portions of the subsets that are already stored in local memories of the plurality of nodes to generate output results for the computing operation; and
transmit final output results to a client device communicatively coupled to the distributed computing environment, the final output results being the output results from a last computing operation in the sequence of computing operations.

12. The non-transitory computer-readable medium of claim 11, wherein the output results of each computing operation at least partially form subsequent input data for a subsequent computing operation in the sequence of computing operations.

13. The non-transitory computer-readable medium of claim 11, wherein determining whether the computing operation is linear or non-linear comprises automatically determining whether the computing operation is linear or non-linear using a machine-learning tool.

14. The non-transitory computer-readable medium of claim 11, further comprising instructions that are executable by the processing device for causing the processing device to: generate a graphical user interface through which a user can provide user input specifying (i) the sequence of computing operations and (ii) whether each computing operation in the sequence of computing operations is linear or non-linear; and determine whether the computing operation is linear or non-linear based on the user input.

15. The non-transitory computer-readable medium of claim 14, further comprising instructions that are executable by the processing device for causing the processing device to: enable a user to selectively view and explore the output results from each computing operation among the sequence of computing operations by interacting with the graphical user interface via the client device.

16. The non-transitory computer-readable medium of claim 11, further comprising instructions that are executable by the processing device for causing the processing device to assign the subsets to the respective nodes among the plurality of nodes by, for each piece of data in each subset: determining a current location of the piece of data, the current location being a particular node among the plurality of nodes on which the piece of data is currently stored; and determining an assignment for the piece of data based on the current location of the piece of data, wherein the assignment is configured to minimize a total number of data movements among the plurality of nodes.

17. The non-transitory computer-readable medium of claim 16, further comprising instructions that are executable by the processing device for causing the processing device to determine the assignment for the piece of data based on a size of the piece of data in memory.

18. The non-transitory computer-readable medium of claim 11, further comprising instructions that are executable by the processing device for causing the processing device to: determine how long it will take a node among the plurality of nodes to execute at least a portion of the computing operation; and assign the subsets to the respective nodes based on how long it will take the node to execute the at least the portion of the computing operation in order to minimize a total amount of time spent to finish executing the sequence of computing operations.

19. The non-transitory computer-readable medium of claim 11, further comprising instructions that are executable by the processing device for causing the processing device to: determine that at least two computing operations in the sequence of computing operations are collapsible, wherein the at least two computing operations are collapsible if they are consecutive in the sequence of computing operations and linear; and in response to determining that the at least two computing operations in the sequence of computing operations are collapsible, cause the plurality of nodes to only execute a latest computing operation among the at least two computing operations and skip one or more earlier computing operations among the at least two computing operations, wherein the latest computing operation is later in the sequence of computing operations than the earlier computing operations.

20. The non-transitory computer-readable medium of claim 11, further comprising instructions that are executable by the processing device for causing the processing device to, in response to determining that the computing operation is a linear operation: determine that the computing operation includes two or more subparts that collectively form the computing operation; cause the plurality of nodes to execute a first subpart among the two or more subparts using the local portions of the subsets that are already stored in the local memories to generate subset fragments that are distributed among the plurality of nodes; cause the subset fragments to be redistributed among the plurality of nodes such that, for each respective subset, all of the subset fragments related to the respective subset are collected on a respective node among the plurality of nodes to which the respective subset is assigned; and subsequent to redistributing the subset fragments among the plurality of nodes, cause the plurality of nodes to execute a second subpart among the two or more subparts on the subset fragments to generate the output results for the computing operation.

21. A method comprising:
receiving, by a processing device, a sequence of computing operations to be consecutively executed in a distributed computing environment formed from a plurality of nodes;

for each computing operation in the sequence of computing operations:
  receiving, by the processing device, input data for the computing operation;
  partitioning, by the processing device, the input data into subsets such that each subset has at least one common characteristic that is different from the other subsets;
  determining, by the processing device, whether the computing operation is linear or non-linear;
  in response to determining that the computing operation is non-linear:
    assigning, by the processing device, the subsets to respective nodes among the plurality of nodes;
    causing, by the processing device, the subsets to be transmitted to the respective assigned nodes; and
    causing, by the processing device, the plurality of nodes to execute respective portions of the computing operation in parallel on the subsets to generate output results for the computing operation; and
  in response to determining that the computing operation is linear:
    causing, by the processing device, the plurality of nodes to execute respective portions of the computing operation in parallel using local portions of the subsets that are already stored in local memories of the plurality of nodes to generate output results for the computing operation; and
    transmitting, by the processing device, final output results to a client device communicatively coupled to the distributed computing environment, the final output results being the output results from a last computing operation in the sequence of computing operations.

22. The method of claim 21, wherein the output results of each computing operation at least partially form subsequent input data for a subsequent computing operation in the sequence of computing operations.

23. The method of claim 21, wherein determining whether the computing operation is linear or non-linear comprises automatically determining whether the computing operation is linear or non-linear using a machine-learning tool.

24. The method of claim 21, further comprising: generating a graphical user interface through which a user can provide user input specifying (i) the sequence of computing operations and (ii) whether each computing operation in the sequence of computing operations is linear or non-linear; and determining whether the computing operation is linear or non-linear based on the user input.

25. The method of claim 24, further comprising: enabling a user to selectively view and explore the output results from each computing operation among the sequence of computing operations by interacting with the graphical user interface via the client device.

26. The method of claim 21, further comprising assigning the subsets to the respective nodes among the plurality of nodes by, for each piece of data in each subset: determining a current location of the piece of data, the current location being a particular node among the plurality of nodes on which the piece of data is currently stored; and determining an assignment for the piece of data based on the current location of the piece of data, wherein the assignment is configured to minimize a total number of data movements among the plurality of nodes.

27. The method of claim 26, further comprising determining the assignment for the piece of data based on a size of the piece of data in memory.

28. The method of claim 21, further comprising: determining how long it will take a node among the plurality of nodes to execute at least a portion of the computing operation; and assigning the subsets to the respective nodes based on how long it will take the node to execute the at least the portion of the computing operation in order to minimize a total amount of time spent to finish executing the sequence of computing operations.

29. The method of claim 21, further comprising: determine that at least two computing operations in the sequence of computing operations are collapsible, wherein the at least two computing operations are collapsible if they are consecutive in the sequence of computing operations and linear; and in response to determining that the at least two computing operations in the sequence of computing operations are collapsible, cause the plurality of nodes to only execute a latest computing operation among the at least two computing operations and skip one or more earlier computing operations among the at least two computing operations, wherein the latest computing operation is later in the sequence of computing operations than the earlier computing operations.

30. The method of claim 21, further comprising, in response to determining that the computing operation is a linear operation: determining that the computing operation includes two or more subparts that collectively form the computing operation; causing the plurality of nodes to execute a first subpart among the two or more subparts using the local portions of the subsets that are already stored in the local memories to generate subset fragments that are distributed among the plurality of nodes; causing the subset fragments to be redistributed among the plurality of nodes such that, for each respective subset, all of the subset fragments related to the respective subset are collected on a respective node among the plurality of nodes to which the respective subset is assigned; and subsequent to redistributing the subset fragments among the plurality of nodes, causing the plurality of nodes to execute a second subpart among the two or more subparts on the subset fragments to generate the output results for the computing operation.

\* \* \* \* \*